(12) United States Patent
Kobayashi

(10) Patent No.: US 12,627,252 B2
(45) Date of Patent: May 12, 2026

(54) TRESTLE

(71) Applicants: Sunstack, LLC, Plainfield, NJ (US);
Roof and Solar Technologies Inc.,
Poway, CA (US)

(72) Inventor: Shuichi Kobayashi, Poway, CA (US)

(73) Assignees: Sunstack, LLC, Plainfield, NJ (US);
Roof and Solar Technologies Inc.,
Poway, CA (US)

( * ) Notice: Subject to any disclaimer, the term of this
patent is extended or adjusted under 35
U.S.C. 154(b) by 136 days.

(21) Appl. No.: 18/396,882

(22) Filed: Dec. 27, 2023

(65) Prior Publication Data

US 2024/0333200 A1 Oct. 3, 2024

(30) Foreign Application Priority Data

Mar. 30, 2023 (JP) ................................. 2023-054580
Jul. 24, 2023 (JP) ................................. 2023-119829

(51) Int. Cl.
E04D 13/18 (2018.01)
F16B 2/06 (2006.01)
(Continued)

(52) U.S. Cl.
CPC .............. H02S 20/23 (2014.12); F16B 2/065
(2013.01); F16B 7/0453 (2013.01);
(Continued)

(58) Field of Classification Search
CPC ........ H02S 20/23; F16B 2/065; F16B 37/045;
F16M 11/2085; F16M 11/2092;
(Continued)

(56) References Cited

U.S. PATENT DOCUMENTS 9,431,953 B2 * 8/2016 Stearns ................. F24S 25/634
10,797,634 B1 * 10/2020 Jasmin .................... H02S 30/00
(Continued)

FOREIGN PATENT DOCUMENTS

CN 215368328 U 12/2021
JP 2001-065120 A 3/2001
(Continued)

OTHER PUBLICATIONS

Office Action dated Oct. 8, 2024, issued for the corresponding
Japanese Patent Application No. 2023-119829.
(Continued)

*Primary Examiner* — Basil S Katcheves
(74) *Attorney, Agent, or Firm* — Ohlandt, Greeley and
Perle, L.L.P>

(57) ABSTRACT

A trestle capable of improving efficiency of attachment work
of a panel is provided. The trestle according to the present
disclosure is a trestle for installing a panel at an installation
place. The trestle includes a base portion fixed to the
installation place, a crosspiece portion supported by the base
portion, and an attachment portion for attaching the panel to
the crosspiece portion. The attachment portion includes a
first attachment portion to press the panel in a pressing
direction pointing toward the crosspiece portion and clamp
the panel between the first attachment portion and the
crosspiece portion and a second attachment portion placed
on a placement surface of the crosspiece portion. The first
attachment portion is combined with the second attachment
portion in such a manner as to be able to slide the panel in
the pressing direction.

13 Claims, 28 Drawing Sheets

(51) Int. Cl.

| | |
|---|---|
| *F16B 7/04* | (2006.01) |
| *F16M 11/20* | (2006.01) |
| *F16M 11/24* | (2006.01) |
| *H02S 20/23* | (2014.01) |
| *H02S 30/10* | (2014.01) |

(52) U.S. Cl.
CPC ..... *F16M 11/2085* (2013.01); *F16M 11/2092* (2013.01); *F16M 11/24* (2013.01); *H02S 30/10* (2014.12); *F16M 2200/027* (2013.01)

(58) Field of Classification Search
CPC ........ F16M 11/24; F24S 25/636; F24S 25/65; F24S 25/61
See application file for complete search history.

(56) References Cited

U.S. PATENT DOCUMENTS

| | | | |
|---|---|---|---|
| 10,840,850 B1 | 11/2020 | Moti et al. | |
| 10,951,157 B1 * | 3/2021 | Young | H02S 30/10 |
| 11,594,998 B1 * | 2/2023 | Kapla | H02S 30/00 |
| 11,757,400 B1 | 9/2023 | Roland et al. | |
| 12,074,558 B2 | 8/2024 | Jonathan et al. | |
| 2011/0174947 A1 | 7/2011 | Wenqiang | |
| 2012/0193310 A1 | 8/2012 | Deiter et al. | |
| 2015/0288320 A1 * | 10/2015 | Stearns | F24S 25/60 |
| | | | 52/173.3 |
| 2016/0043689 A1 | 2/2016 | Greg et al. | |
| 2016/0111835 A1 | 4/2016 | Manish | |
| 2016/0111995 A1 | 4/2016 | Nayer | |
| 2016/0111997 A1 | 4/2016 | Ganshaw | |
| 2017/0102167 A1 * | 4/2017 | Stephan | H02S 20/23 |
| 2017/0194902 A1 | 7/2017 | Shawn et al. | |

| | | | |
|---|---|---|---|
| 2018/0342974 A1 * | 11/2018 | Jasmin | F24S 25/636 |
| 2019/0190437 A1 * | 6/2019 | Kobayashi | H02S 20/30 |
| 2019/0372507 A1 | 12/2019 | Shuichi | |
| 2020/0313604 A1 * | 10/2020 | Harris | F16B 2/065 |
| 2021/0067083 A1 * | 3/2021 | Stephan | F24S 25/634 |
| 2021/0128559 A1 | 5/2021 | Xu et al. | |
| 2021/0194410 A1 * | 6/2021 | Yang | H02S 20/23 |
| 2021/0285689 A1 * | 9/2021 | Affentranger, Jr. | H02S 30/10 |
| 2021/0328540 A1 * | 10/2021 | Wentworth | F24S 25/33 |
| 2022/0060143 A1 * | 2/2022 | Neal | H02S 20/23 |
| 2022/0216823 A1 * | 7/2022 | Wang | F16B 5/0635 |
| 2022/0255494 A1 * | 8/2022 | Wildes | F24S 25/636 |
| 2022/0337187 A1 * | 10/2022 | Huang | H02S 30/00 |
| 2022/0345074 A1 * | 10/2022 | Neal | H02S 30/10 |
| 2022/0352848 A1 * | 11/2022 | Meine | H02S 20/23 |
| 2022/0407451 A1 * | 12/2022 | Jacobs | H02S 20/20 |
| 2023/0068225 A1 * | 3/2023 | Lowrey | F16M 11/2021 |
| 2023/0133308 A1 * | 5/2023 | Ballentine | F24S 25/63 |
| | | | 136/251 |
| 2023/0228372 A1 | 7/2023 | Stephan | |

FOREIGN PATENT DOCUMENTS

| | | |
|---|---|---|
| JP | 2006057357 A | 3/2006 |
| JP | 3160551 U | 7/2010 |
| JP | 2012-180668 A | 9/2012 |
| JP | 3189303 U | 3/2014 |
| JP | 2015-74903 A | 4/2015 |
| JP | 2020-003050 A | 1/2020 |

OTHER PUBLICATIONS

Office Action dated Jul. 25, 2025, issued for the corresponding U.S. Appl. No. 18/491,395.

* cited by examiner

TRESTLE

CROSS-REFERENCE TO RELATED APPLICATIONS

Error! No sequence specified. This application claims the benefit of Japanese Patent Application No. 2023-54580, filed on Mar. 30, 2023, and Japanese Patent Application No. 2023-119829, filed on Jul. 24, 2023, of which the entirety of the disclosures is incorporated by reference herein.

FIELD OF THE INVENTION

This application relates to a trestle.

BACKGROUND OF THE INVENTION

In an attachment structure of a panel described in Unexamined Japanese Patent Application Publication No. 2006-57357, a crosspiece member is fixed to a support piece disposed on a support tile via a fixture. In the crosspiece member, a groove portion that extends in the longitudinal direction is formed, and a panel is attached via an attachment mounted in the groove portion.

However, in the attachment structure of a panel described in Unexamined Japanese Patent Application Publication No. 2006-57357, there is a problem in that the attachment is not stable on the crosspiece member when the panel is attached to the crosspiece member and efficiency of attachment work of a panel deteriorates.

The present disclosure has been made in consideration of the above-described circumstances, and an objective of the present disclosure is to provide a trestle capable of improving efficiency of attachment work of a panel.

SUMMARY OF THE INVENTION

In order to achieve the above-described objective, a trestle of the present disclosure is a trestle for installing a panel at an installation place. The trestle includes a base portion fixed to the installation place, a crosspiece portion supported by the base portion, and an attachment portion for attaching the panel to the crosspiece portion. The attachment portion includes a first attachment portion to press the panel in a pressing direction pointing toward the crosspiece portion and clamp the panel between the first attachment portion and the crosspiece portion and a second attachment portion placed on a placement surface of the crosspiece portion, and the first attachment portion is combined with the second attachment portion in such a manner as to be able to slide the panel in the pressing direction.

On one attachment portion of the first attachment portion and the second attachment portion, an insertion portion that extends in the pressing direction may be formed, and on the other attachment portion, an inserted portion into which the insertion portion is inserted and that enables the insertion portion to move in the pressing direction may be formed.

The insertion portion may be a projecting plate portion that projects from the first attachment portion in the pressing direction, and the inserted portion may be an insertion groove into which the projecting plate portion is inserted and that is formed on the second attachment portion.

The first attachment portion may include two side wall portions arranged facing each other, a joining plate portion connecting one edge side of the two side wall portions to each other, and extended portions each extending outward from one of the other edge sides opposed to the one edge sides of the two side wall portions, and the projecting plate portion may project from the joining plate portion in the pressing direction.

A groove portion that extends in a direction in which the crosspiece portion extends may be formed from an outer circumferential surface of the crosspiece portion toward an inside, the attachment portion may include a bolt inserted into the first attachment portion and the second attachment portion and a nut screwing onto the bolt and housed in and locked to the groove portion of the crosspiece portion, and the panel maybe clamped between the extended portion and the crosspiece portion by an axial force introduced into the bolt.

The nut may be formed in a quadrilateral shape having a longitudinal direction and changes an attitude between a first attitude in which the longitudinal direction is aligned with an extending direction of the groove portion and the nut is freely removable and insertable from and into the groove portion and a second attitude in which the nut has rotated about an axis of the bolt from the first attitude and the nut is caught by the groove portion.

On portions by which the nut and the groove portion come into contact with each other, a protruding portion and a recessed portion that engage with each other may be formed.

The second attachment portion may include a locking portion coming into contact with a surface of the panel on an opposite side to a surface of the panel on which the first attachment portion presses the panel.

The second attachment portion may include a bottom wall portion coming into contact with a placement surface of the crosspiece portion, a first rising portion rising from the bottom wall portion, a second rising portion rising from the bottom wall portion with a gap interposed between the first rising portion and the second rising portion, and the locking portion extended out from the bottom wall portion, and between the first rising portion and the second rising portion, the insertion groove may be formed.

The locking portion may be formed in such a manner as to be stepped down from the bottom wall portion and a surface of the locking portion coming into contact with the panel may be flush with the placement surface of the crosspiece portion.

Two locking portions may be disposed with a gap interposed between the two locking portions, the gap being wider than width in a direction orthogonal to a longitudinal direction of the crosspiece portion, and be arranged on both sides of the crosspiece portion.

The locking portion may extend from a central portion of the bottom wall portion and be housed in a groove portion of the crosspiece portion.

In each of the first attachment portion and the second attachment portion, a bolt hole into which the bolt is inserted may be formed.

In the first attachment portion, a bolt hole into which the bolt is inserted may be formed, and in the second attachment portion, a notch into which the bolt is inserted may be formed.

On one attachment portion of the first attachment portion and the second attachment portion, a projecting plate portion that extends in the pressing direction may be formed, and on the other attachment portion, a slide surface on which the projecting plate portion slides may be formed.

The slide surface may be formed at an end surface of the second attachment portion.

The first attachment portion may include two side wall portions arranged facing each other, a joining plate portion connecting one edge side of the two side wall portions to each other, and extended portions each extending outward from one of the other edge sides opposed to the one edge sides of the two side wall portions, and the projecting plate portion may project from the joining plate portion in the pressing direction.

A groove portion that extends in an extending direction of the crosspiece portion may be formed from an outer circumferential surface of the crosspiece portion toward an inside, the attachment portion may include a bolt inserted into the first attachment portion and screwing into the second attachment portion, and the panel may be clamped between the first attachment portion and the crosspiece portion by an axial force introduced into the bolt.

The second attachment portion may include a locking portion coming into contact with a surface of the panel on an opposite side to a surface of the panel on which the first attachment portion presses the panel.

The placement surface may be formed on a projecting portion that is formed inside the crosspiece portion and in the groove portion, the second attachment portion may include a bottom wall portion housed in the groove portion and temporarily placed on a placement surface and the locking portion rising from the bottom wall portion, and width of the bottom wall portion may be wider than width of the groove portion and when an axial force of the bolt is introduced, the bottom wall portion may be caught by the crosspiece portion in the groove portion.

The present disclosure enables a trestle capable of improving efficiency of attachment work of a panel to be provided.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Embodiment 1

Figure 1:
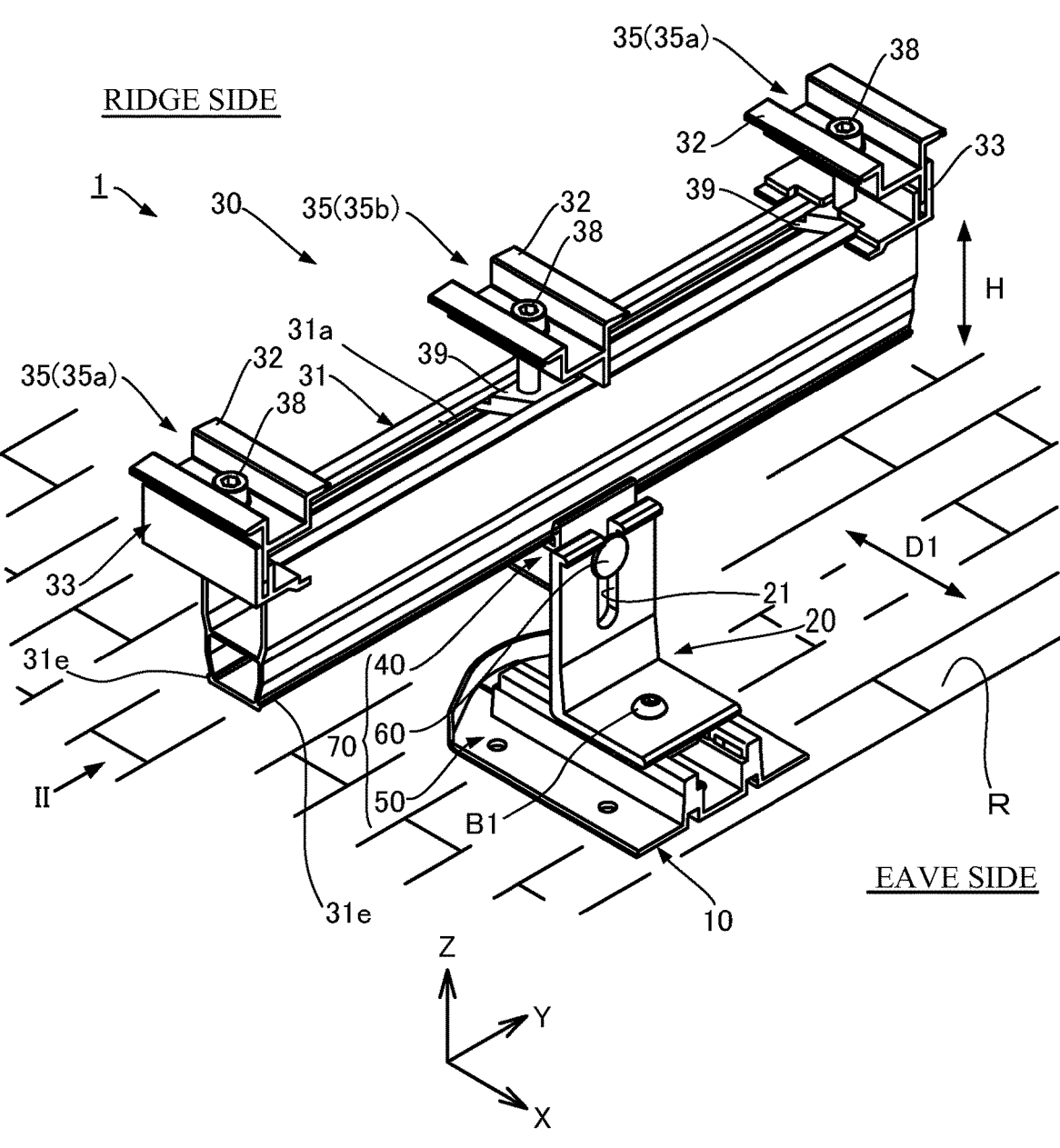
FIG. 1 is a perspective view of a trestle according to Embodiment 1 of the present disclosure.

Embodiment 1 of the present disclosure is described below using the drawings. Note that, to facilitate understanding, XYZ coordinates that are orthogonal to one another are set and are appropriately referred to. An XY plane of the XYZ coordinates illustrated in FIG. 1 is a plane parallel with a roof surface R on which a trestle 1 is installed. The Z-axis direction is a direction parallel with a height direction H from the roof surface R. In addition, in Embodiment 1, an cave-ridge direction that is a direction from the ridge to an cave of a building is the same direction as the X-axis direction.

Figure 2:
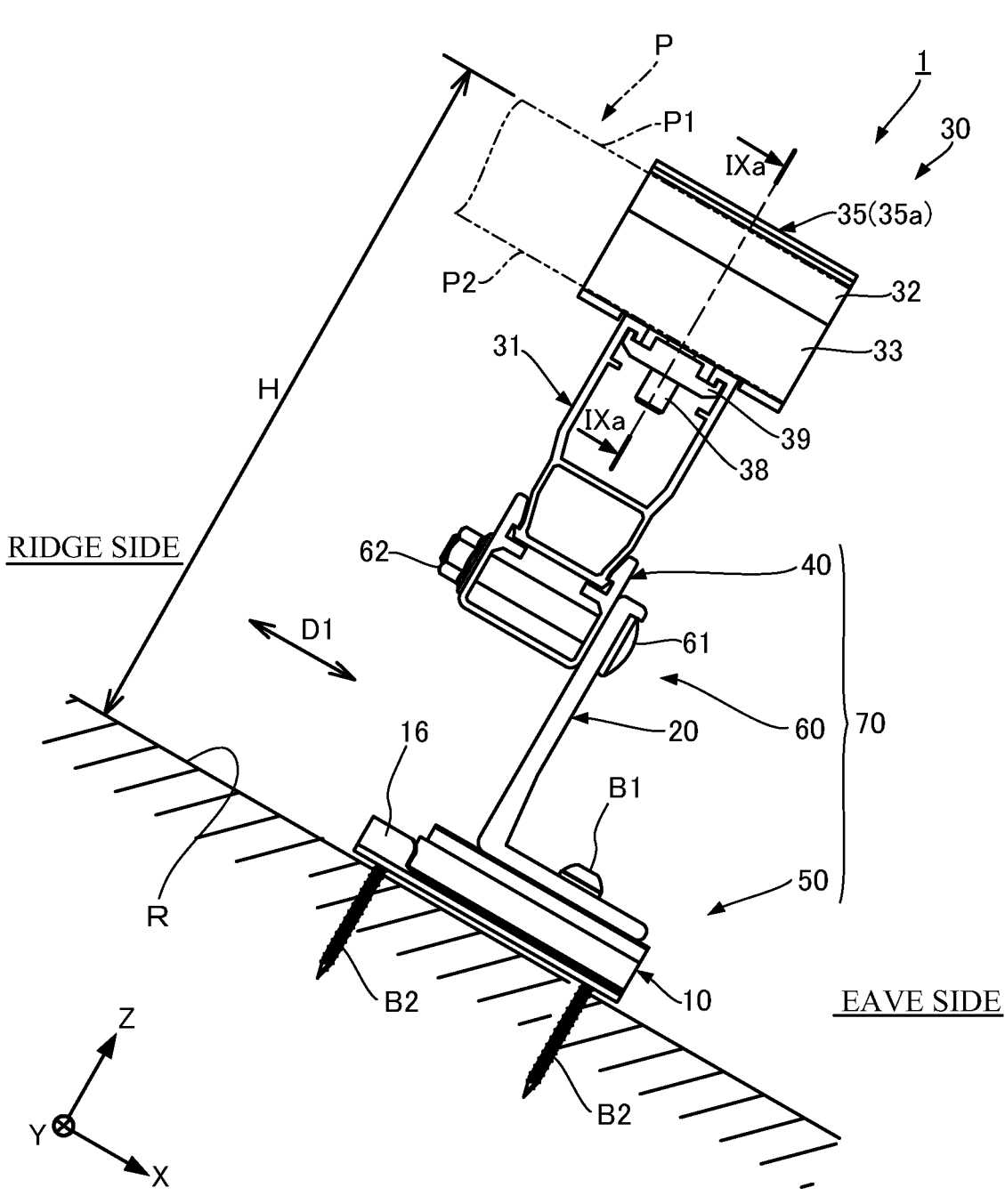
FIG. 2 is a side view of the trestle when viewed from an arrow II in FIG. 1.

The trestle 1 is, for example, attached to the roof surface R of the building, as illustrated in FIGS. 1 and 2 and is used to support a solar panel P that serves as an installation target to be installed on the roof surface R. The solar panel P is an example of a panel. Note that in Embodiment 1, a building to which the trestle 1 is attached is a house that has caves and a ridge of a roof. That is, the trestle 1 is intended to install a solar panel P on the roof of the house that is an installation place. The trestle 1 according to Embodiment 1 includes a fixing portion 30 and a base portion 70 that supports the fixing portion 30. In addition, the base portion 70 includes a receiving member 40, a base unit 50, and a first fastener 60.

Figure 3:
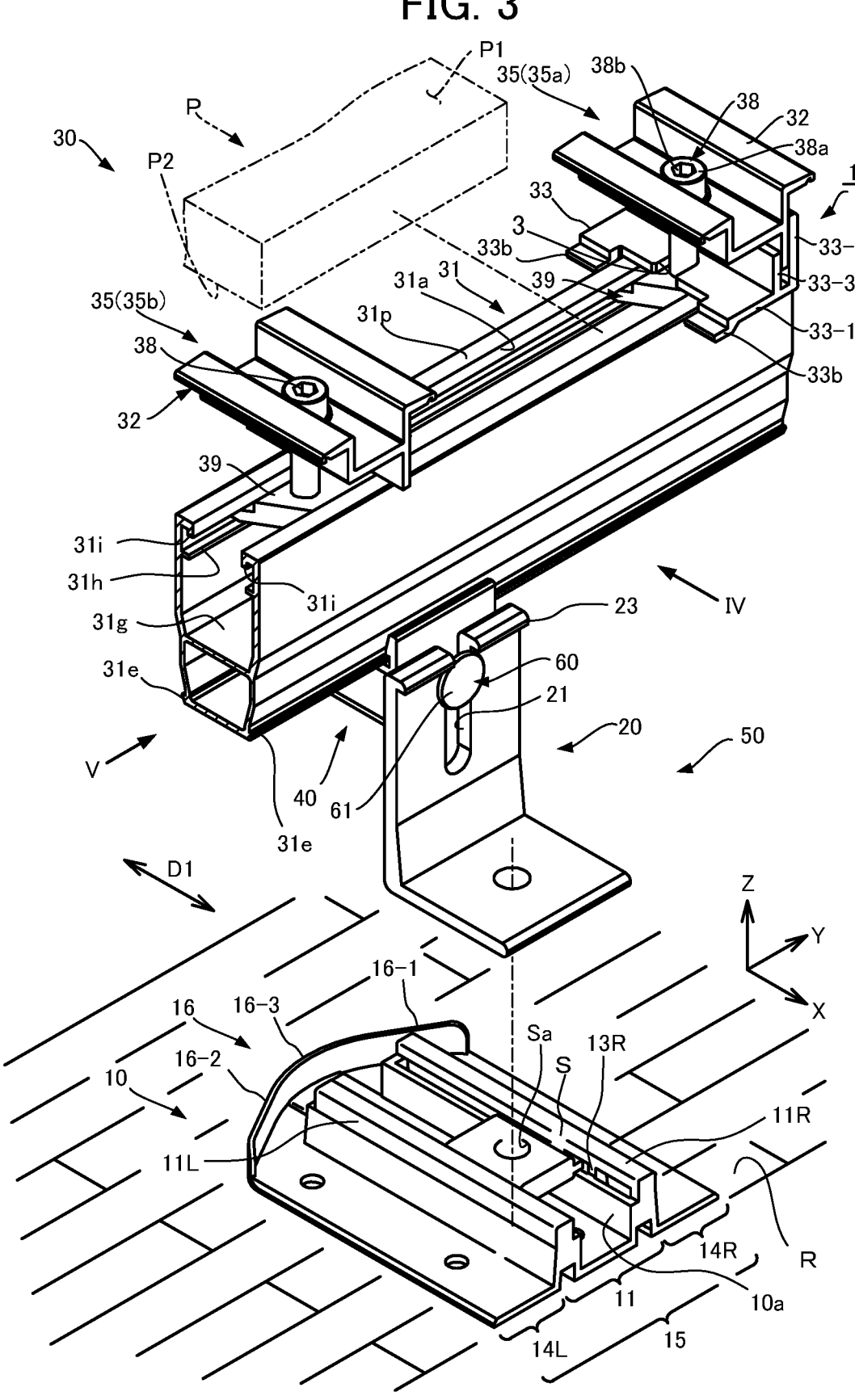
FIG. 3 is an exploded perspective view illustrating a portion of the trestle according to Embodiment 1 (part 1)

The fixing portion 30 fixes a solar panel P, as illustrated in FIGS. 2 and 3. The fixing portion 30 is fixed to the receiving member 40 by the first fastener 60. The fixing portion 30 includes a crosspiece member 31 serving as a crosspiece portion and an attachment portion 35. Constituent components of the fixing portion 30 are formed of, for example, metal. However, the present disclosure is not limited to the configuration. The constituent components of the fixing portion 30 may be formed of a material other than metal. For example, the constituent components of the fixing portion 30 may be formed of a material having high rigidity, such as resin and ceramic. In addition, some of the constituent components of the fixing portion 30 may be formed of a material different from a material of the other components. However, the constituent components of the fixing portion 30 are preferably formed of metal, and more preferably all of the constituent components of the fixing portion 30 are formed of the same metallic material from a viewpoint of production cost.

The crosspiece member 31 is a lateral crosspiece that is extended in the Y-axis direction, as illustrated in FIG. 1. The crosspiece member 31 is formed in such a manner that an XZ cross section of the crosspiece member 31 is a rectangular cylindrical shape the longitudinal direction of which is aligned with the Z-axis direction. The crosspiece member 31 is, for example, formed by extrusion molding metal. Specifically, the crosspiece member 31 is, for example, formed by extrusion molding aluminum. Note that in Embodiment 1, the crosspiece member 31 is a lateral crosspiece that is extended in a direction orthogonal to the cave-ridge direction. However, the present disclosure is not limited to the configuration. The crosspiece member 31 may be a crosspiece other than a lateral crosspiece. For example, the crosspiece member 31 may be a vertical crosspiece that is extended in the same direction as the cave-ridge direction. In addition, the crosspiece member 31 may be a crosspiece other than a lateral crosspiece and a vertical crosspiece that is extended in a direction intersecting the cave-ridge direction.

Figure 5:
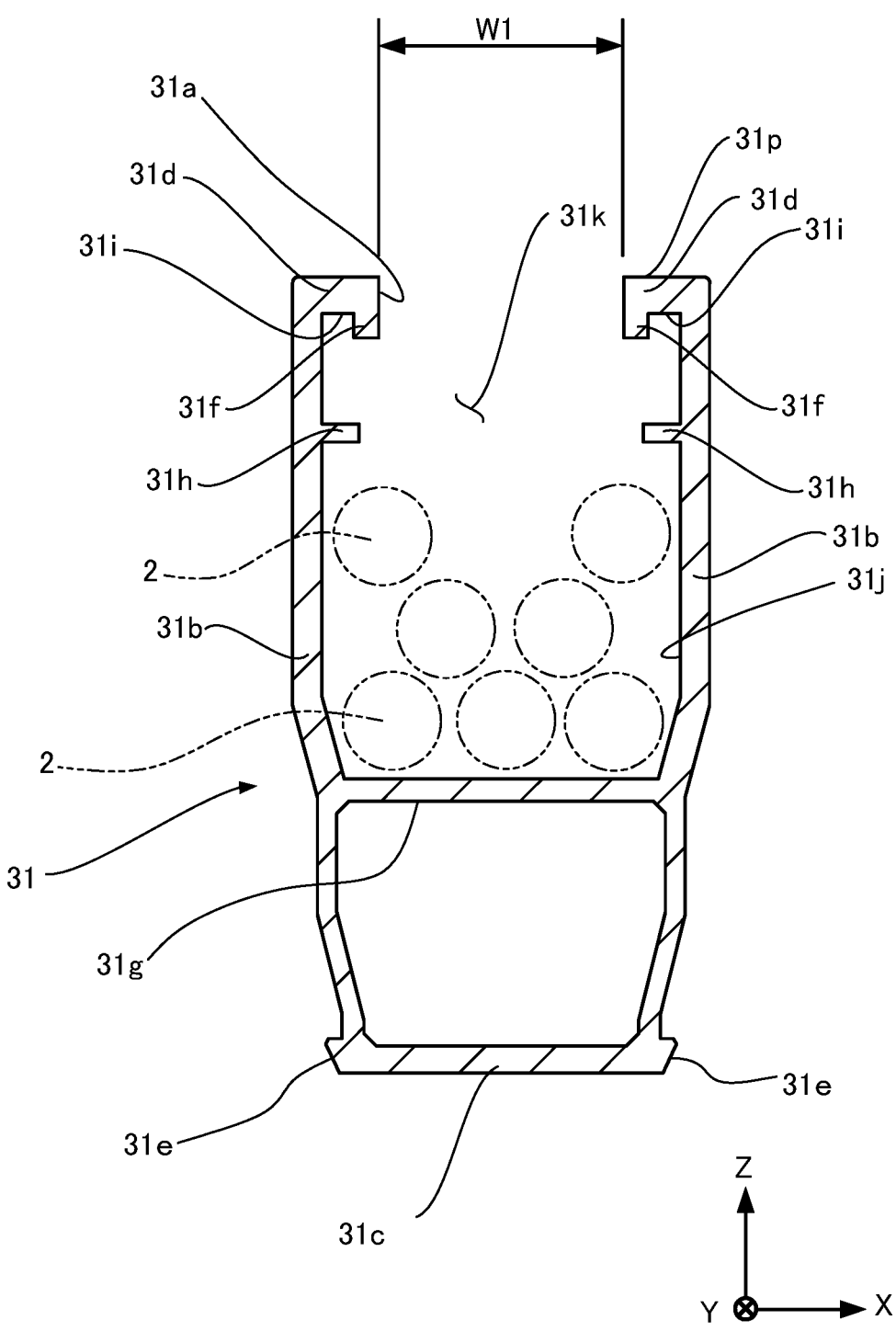
FIG. 5 is a cross-sectional view of a crosspiece member when viewed from an arrow V in FIG. 3.

The crosspiece member 31 is formed in a substantially rectangular cylindrical shape, as illustrated in FIG. 5. The crosspiece member 31 includes two side wall portions 31b and 31b that are arranged with a gap interposed therebetween in the X-axis direction, a bottom wall portion 31c that connects edges on the −Z side of the two side wall portions 31b and 31b, and upper wall portions 31d and 31d that project inward from edges on the +Z side of the two side wall portions 31b and 31b, respectively.

Both edges of the bottom wall portion 31c project to the outer side of the two side wall portions 31b and 31b, and the projecting portions form first locking portions 31e. Each of the first locking portions 31e is formed in a linear shape that extends along the Y-axis direction.

In addition, between the two upper wall portions 31d and 31d, a gap of width W1 is formed. Because of this configuration, on a surface on the +Z side of the crosspiece member 31, a slit-shaped opening 31a of width W1 that extends in the Y-axis direction (a direction in which the crosspiece member 31 extends) is formed, as illustrated in FIG. 1.

In addition, in the crosspiece member 31, first projecting portions 31f and 31f that project from tips of the upper wall portions 31d and 31d towards-Z-direction, respectively, a partition wall portion 31g that partitions an internal space of the crosspiece member 31, and second projecting portions 31h and 31h that project inward from inner surfaces of the side wall portions 31b and 31b, respectively are formed, as illustrated in FIG. 5.

Figure 7:
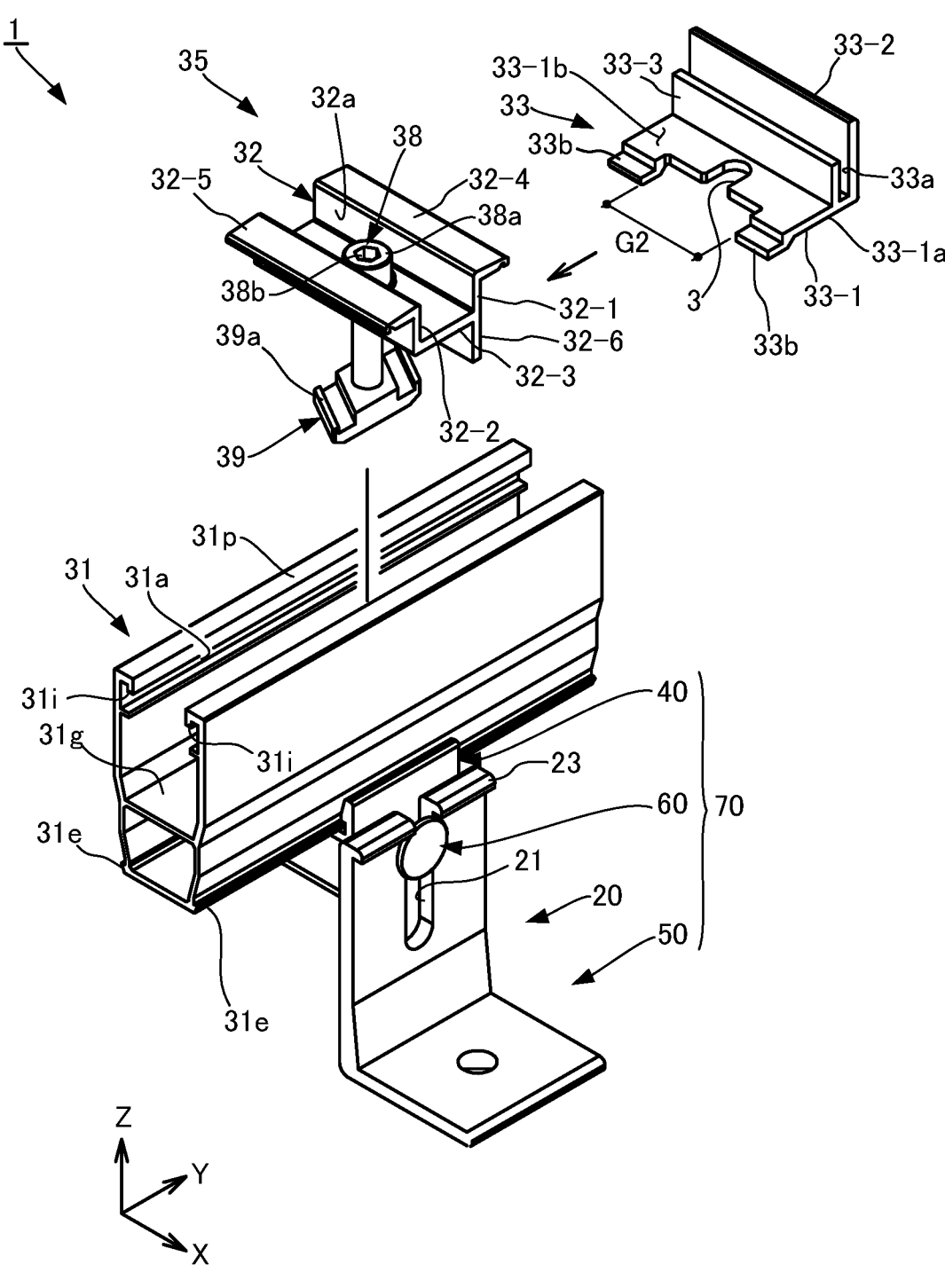
FIG. 7 is an exploded perspective view illustrating a portion of the trestle according to Embodiment 1 (part 2)

The first projecting portions 31f and 31f form wall portions of the slit-shaped opening 31a in conjunction with the upper wall portions 31d and 31d. On the inside of the crosspiece member 31, groove portions 31i that are defined by the first projecting portions 31f, the upper wall portions 31d, and the side wall portions 31b are formed on both sides of the opening 31a along the Y-axis direction. Into the groove portions 31i and 31i, portions of a nut 39 illustrated in FIG. 7 are fitted, as described later.

The partition wall portion 31g is formed at a position as high as approximately one-third of height in the height direction (the Z-axis direction) from the lower side of the crosspiece member 31, as illustrated in FIG. 5. Forming the partition wall portion 31g enables rigidity of the crosspiece member 31 to be increased. On the +Z side of the partition wall portion 31g, a groove portion 31j that is defined by the side wall portions 31b and 31b and the partition wall portion 31g and the upper portion of which in the drawing is opened by the slit-shaped opening 31a is formed. The groove portion 31j formed as described above forms a housing space 31k that can house various types of components on the inside of the crosspiece member 31.

The second projecting portions 31h and 31h are installed at the same height positions between the upper wall portions 31d and the partition wall portion 31g with a gap interposed between the tips of the second projecting portions 31h and 31h. The second projecting portions 31h and 31h increase the rigidity of the crosspiece member 31 and also roughly position the nut 39 by coming into contact with the nut 39 illustrated in FIG. 7, which is described later. Because of this configuration, portions of the nut 39 are facilitated to be fitted into the groove portions 31i and 31i.

Figure 6:
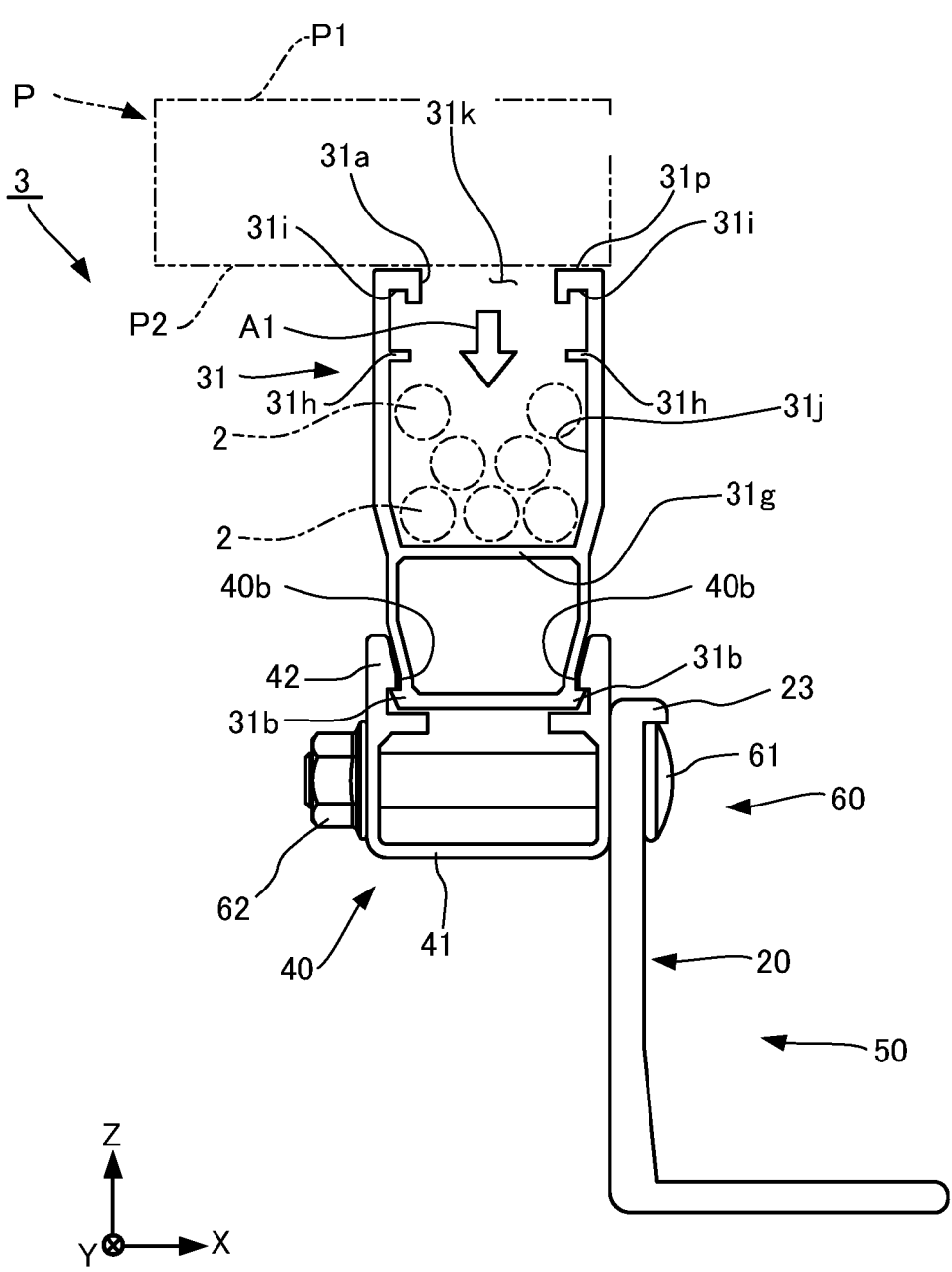
FIG. 6 is a side view of the trestle according to Embodiment 1.

As illustrated in FIG. 6, in the housing space 31k on the inside of the crosspiece member 31, a cable 2 that is led out from a solar panel P is housed. The cable 2 is caused to pass through the opening 31a and between the second projecting portions 31h and 31h, as illustrated by an arrow A1 and is housed in the housing space 31k. Although in Embodiment 1, the cable 2 is housed in the housing space 31k as described above, objects housed in the housing space 31k are not limited to the cable 2 and an object other than the cable 2 may be housed in the housing space 31k. For example, in the housing space 31k, a cable connector that is connected to the cable 2 may be housed.

In addition, an upper surface of the crosspiece member 31 that faces the +Z side forms a placement surface 31p on which a solar panel P is arranged. The placement surface 31p on the +Z side is formed on a surface parallel with the XY plane in such a way that the solar panel P can be easily arranged.

Figure 4:
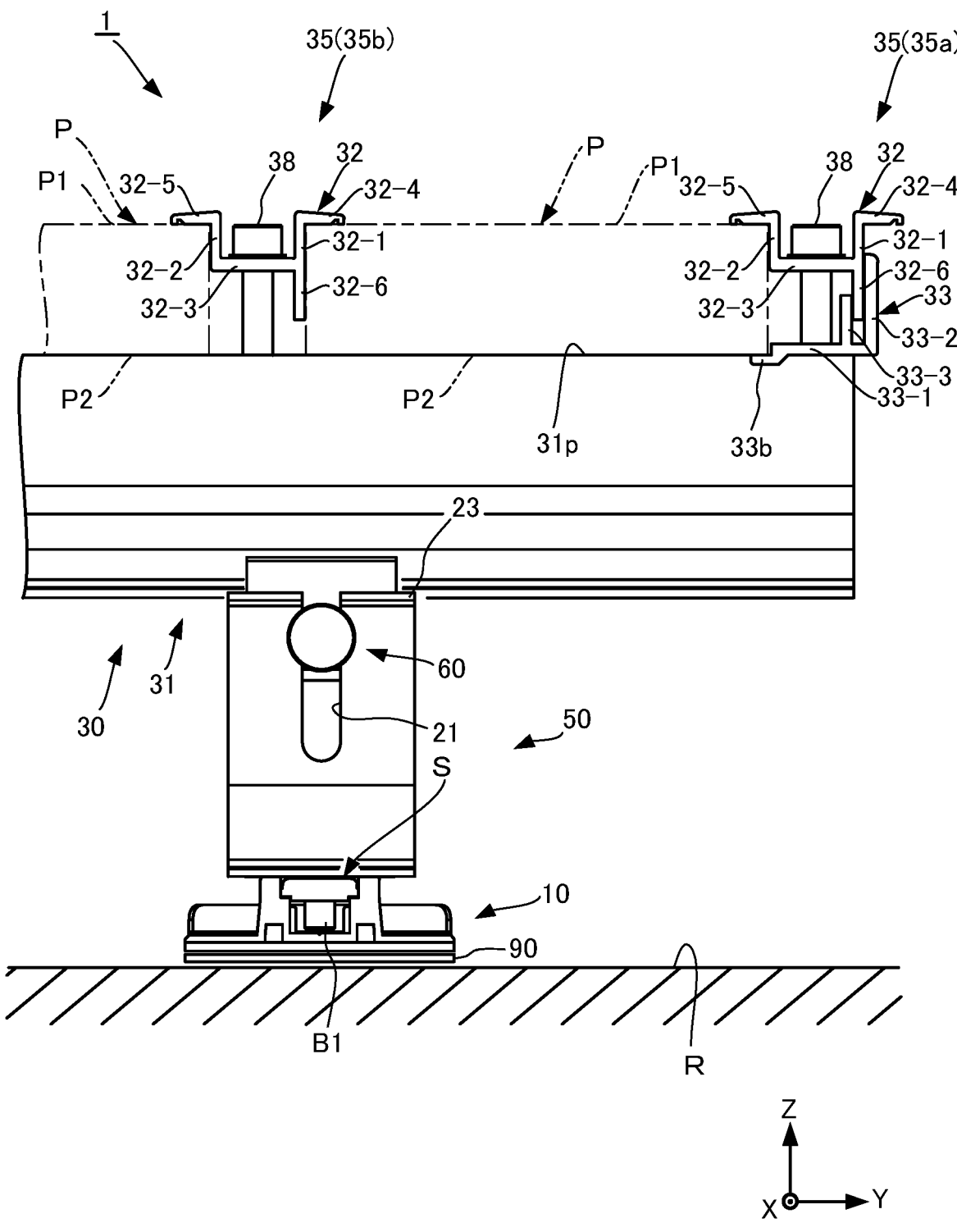
FIG. 4 is a rear view of the trestle when viewed from an arrow IV in FIG. 3.

Attachment portions 35 are attached to the crosspiece member 31 and clamp solar panels P between the attachment portions 35 and the crosspiece member 31, as illustrated in FIGS. 3 and 4. In the present embodiment, three attachment portions 35 are disposed at intervals in the longitudinal direction of the crosspiece member 31, as illustrated in FIG. 1. Each of two attachment portions 35 disposed on both sides among the three attachment portions 35 is an attachment portion 35a for end and clamps a solar panel P between the attachment portion 35a for end and the crosspiece member 31. In addition, an attachment portion 35 disposed at the center in FIG. 1 is an attachment portion 35b for middle position and clamps two solar panels P between the attachment portion 35a for end and the crosspiece member 31 on both sides of the attachment portion 35b for middle position, as illustrated in FIG. 4.

Each of the attachment portions 35a for end includes a first attachment portion 32 that presses a solar panel P toward the crosspiece member 31 and clamps the solar panel P between the first attachment portion 32 and the crosspiece member 31 and a second attachment portion 33 that is placed on the placement surface 31p of the crosspiece member 31 and is combined with the first attachment portion 32 in such a manner that the first attachment portion 32 is slidable along the Z-axis.

On the other hand, the attachment portion 35b for middle position, although including a first attachment portion 32, does not include a second attachment portion 33. A configuration of the attachment portion 35b for middle position other than the non-existence of a second attachment portion 33 is the same as the configuration of the attachment portion 35a for end.

Cross sections of the first attachment portion 32 when sectioned in a direction orthogonal to the X-axis have the same shape and size along the X-axis direction, as illustrated in FIG. 3. When viewed in a direction parallel with the X-axis, the first attachment portion 32 includes two side wall portions 32-1 and 32-2, a joining plate portion 32-3, two extended portions 32-4 and 32-5, and a projecting plate portion 32-6, as illustrated in FIG. 8.

The two side wall portions 32-1 and 32-2 are arranged with a gap interposed therebetween in the Y-axis direction and in such a manner as to face each other. The joining plate portion 32-3 connects edge sides on one side (on the –Z side) of the two side wall portions 32-1 and 32-2 to each other. The two extended portions 32-4 and 32-5 are extended outward from edge sides on the other side (on the +Z side) of the two side wall portions 32-1 and 32-2 that are opposed to the edge sides on the one side of the two side wall portions 32-1 and 32-2, respectively. The extended portion 32-5 comes into contact with a first surface P1 of a solar panel P that faces the +Z side, the solar panel P being placed on the placement surface 31p of the crosspiece member 31, as illustrated in FIG. 4 and presses the solar panel P toward the crosspiece member 31. A pressing direction in which the extended portion 32-5 presses the solar panel P is the –Z-direction. Note that in the attachment portion 35b for middle position illustrated in FIG. 4, the extended portion 32-4 also presses a solar panel P toward the crosspiece member 31 in addition to the extended portion 32-5. The projecting plate portion 32-6 projects in the –Z-direction from the joining plate portion 32-3 as an insertion portion and is a plate-shaped member parallel with the XZ plane, as illustrated in FIG. 8. Note that the projecting plate portion 32-6 projects from an edge portion on the +Y side of the joining plate portion 32-3 and is formed in such a form that the side wall portion 32-1 is extended to the –Z side. Note that the position of the projecting plate portion 32-6 on the joining plate portion 32-3 is not limited to a position in the case where the projecting plate portion 32-6 is formed at the edge portion and can be set to an arbitrary position as long as the position enables the first attachment portion 32 to slide along the Z-axis (in the pressing direction) as described later.

The first attachment portion 32 has a recessed portion 32a, the recessed portion 32a extending in one direction, defined by the two side wall portions 32-1 and 32-2 and the joining plate portion 32-3, as illustrated in FIG. 7. In the present embodiment, as illustrated in FIG. 1, the first attachment portion 32 is arranged with a direction in which the recessed portion 32a extends parallel with the X-axis, that is, with the direction in which the recessed portion 32a extends orthogonal to a direction in which the slit-shaped opening 31a extends. Length in the X-axis direction of the first attachment portion 32 is longer than length (width) in the X-axis direction of the crosspiece member 31. Therefore, the first attachment portion 32 arranged on the crosspiece member 31 projects from both sides of the crosspiece member 31. In the joining plate portion 32-3 that defines a portion of the recessed portion 32a of the first attachment portion 32, a bolt insertion hole 32-3a into which a bolt 38, which is described later, is inserted is formed, as illustrated in FIG. 9.

Figure 8:
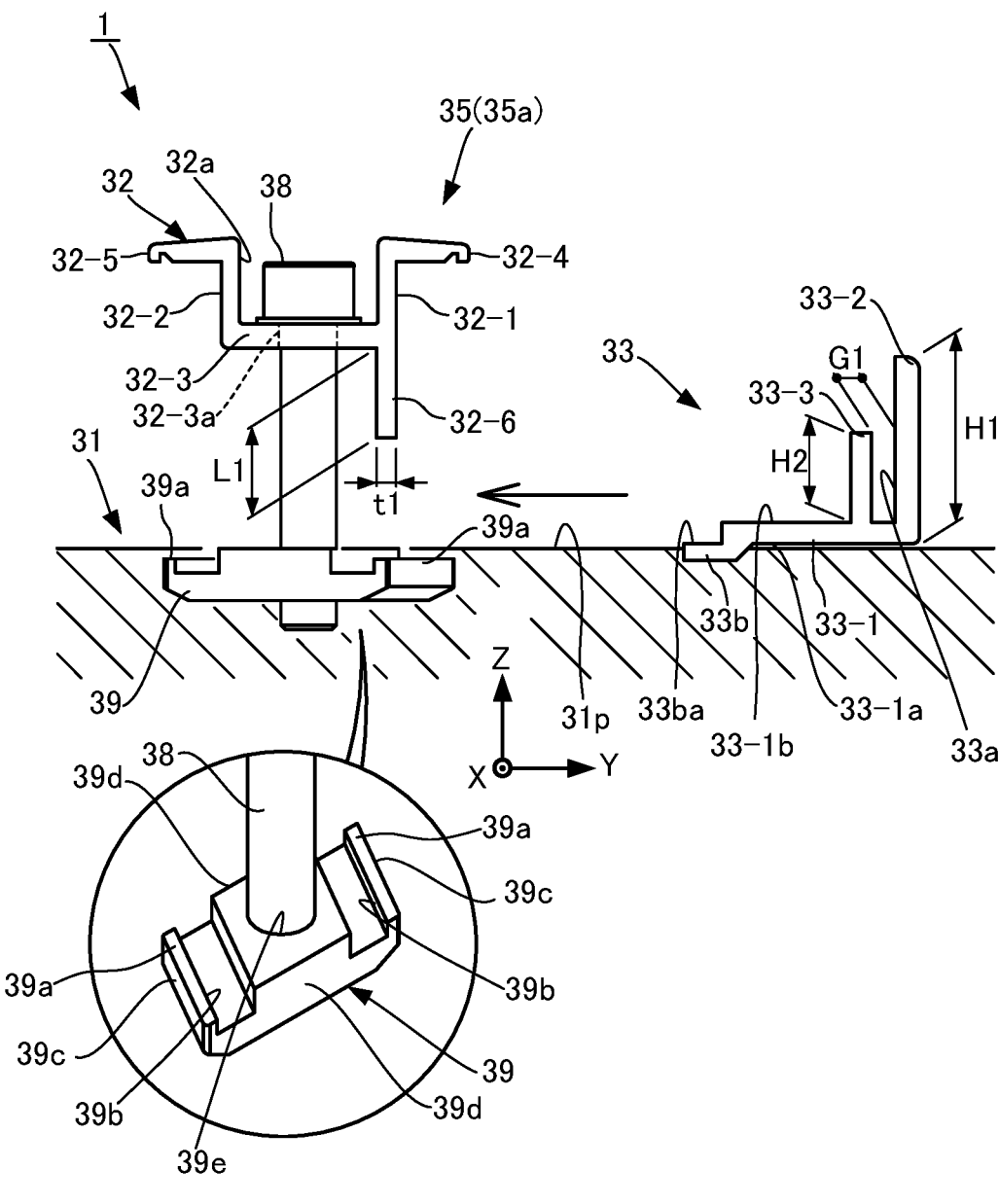
FIG. 8 is a side view of an attachment portion of the trestle according to Embodiment 1.

The second attachment portion 33 includes a substantially rectangular bottom wall portion 33-1 and a first rising portion 33-2 and a second rising portion 33-3 that rise from the bottom wall portion 33-1 with a gap interposed therebetween, as illustrated in FIGS. 7 and 8.

The bottom wall portion 33-1 is formed in a plate shape and includes a bottom surface 33-1a that is placed on the placement surface 31p of the crosspiece member 31. In the bottom wall portion 33-1, a notch 3 having a shape including a semicircular portion that is cut out inward from the center of a side on the –Y side is formed, as illustrated in FIG. 7. Into the notch 3, the bolt 38 that is inserted into the first attachment portion 32 is inserted.

The first rising portion 33-2 is a rectangular plate that rises from an upper surface 33-1b of the bottom wall portion 33-1 along an opposite side on the +Y side that is opposed to the side in which the notch 3 is formed. The first rising portion 33-2 has a long side coinciding with the opposite side on the +Y side of the bottom wall portion 33-1 and is formed orthogonal to the bottom wall portion 33-1. The first rising portion 33-2 has a height (a length in the Z-axis direction) H1 from the upper surface 33-1b of the bottom wall portion 33-1.

The second rising portion 33-3 is a rectangular plate that rises from the upper surface 33-1b of the bottom wall portion 33-1 with a gap G1 interposed between the second rising portion 33-3 and the first rising portion 33-2 on the –Y side, as illustrated in FIG. 8. The second rising portion 33-3 is parallel with the first rising portion 33-2 and is formed orthogonal to the bottom wall portion 33-1. The second rising portion 33-3 has a height H2 from the upper surface 33-1b of the bottom wall portion 33-1. The height H2 of the second rising portion 33-3 is lower than the height H1 of the first rising portion 33-2. The gap G1 between the first rising portion 33-2 and the second rising portion 33-3 forms an insertion groove 33a that serves as an inserted portion into which the projecting plate portion 32-6 is inserted.

Figure 9A:
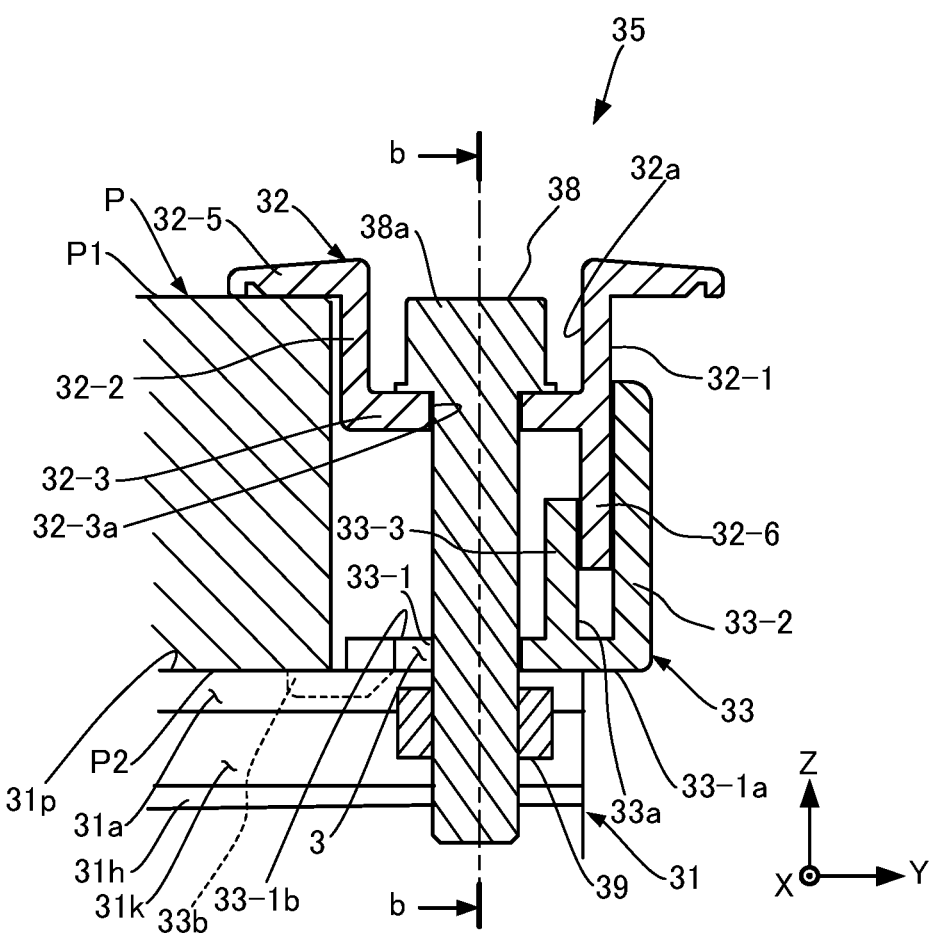
FIG. 9A is a cross-sectional view taken along the line IXa-IXa in FIG. 2.

Between the first rising portion 33-2 and the second rising portion 33-3, the projecting plate portion 32-6 of the first attachment portion 32 is inserted, as illustrated in FIG. 9A. Thickness t1 of the projecting plate portion 32-6 illustrated in FIG. 8 is approximately as thick as the gap G1 between the first rising portion 33-2 and the second rising portion 33-3 or is smaller than the gap G1 to the extent of not causing the first attachment portion 32 to be unstable. In addition, projection length L1 of the projecting plate portion 32-6 from the joining plate portion 32-3 is, for example, the same as the height H2 of the second rising portion 33-3 from the upper surface 33-1b. Because of this configuration, the projecting plate portion 32-6 can be inserted into the insertion groove 33a over the entire length of the projection length L1. In addition, the first attachment portion 32 can be slid along the Z-axis without causing the first attachment portion 32 to be unstable with respect to the second attachment portion 33 and smoothly until the projecting plate portion 32-6 comes out of the insertion groove 33*a*.

In addition, on the bottom wall portion 33-1, two second locking portions 33*b* and 33*b* that extend out in the −Y-direction from the side on the −Y side are formed, as illustrated in FIGS. 7 and 8.

The second locking portions 33*b* are formed at both ends in the X-axis direction of the bottom wall portion 33-1 one by one, as illustrated in FIG. 7. Shapes and sizes of the two second locking portions 33*b* and 33*b* are the same. A gap G2 formed between the two second locking portions 33*b* and 33*b* is wider than the width in the X-axis direction of the crosspiece member 31. Therefore, when the second attachment portion 33 is placed on the crosspiece member 31, the two second locking portions 33*b* and 33*b* are arranged on both sides of the crosspiece member 31, as illustrated in FIG. 3. Note that each of the second locking portions 33*b* is stepped down to the −Z side from the bottom wall portion 33-1 and has an upper surface 33*ba* (a surface on the +Z side) that is offset downward (in the −Z-direction) from the upper surface 33-1*b* (a surface on the +Z side) of the bottom wall portion 33-1, as illustrated in FIG. 8. Because of this configuration, when the second attachment portion 33 is arranged on the placement surface 31*p*, the upper surfaces 33*ba* of the second locking portions 33*b* are substantially flush with the placement surface 31*p*. Therefore, the second locking portions 33*b* come into contact with a second surface P2 of a solar panel P that faces the −Z side (on the opposite side to the first surface P1), the solar panel P being arranged on the placement surface 31*p*, as illustrated in FIG. 4.

Each of the attachment portions 35*a* for end includes, as a fastener, a bolt 38 and a nut 39 screwing onto the bolt 38 to cause the crosspiece member 31 and the first attachment portion 32 to exert an axial force to clamp a solar panel P, as illustrated in FIG. 3. By the bolt 38 and the nut 39, the crosspiece member 31 and the first attachment portion 32 are fastened to each other.

The bolt 38 is a hexagon socket head bolt that has a hexagon socket 38*b* formed on a head 38*a*. The bolt 38 is inserted into the bolt insertion hole 32-3*a* formed in the first attachment portion 32 and the notch 3 formed in the second attachment portion 33, as illustrated in FIG. 9A. Height of the head 38*a* of the bolt 38 is set lower than depth of the recessed portion 32*a* formed on the first attachment portion 32. Because of this configuration, it is possible to prevent the head 38*a* of the bolt 38 from protruding out of the first attachment portion 32.

Figure 10A:
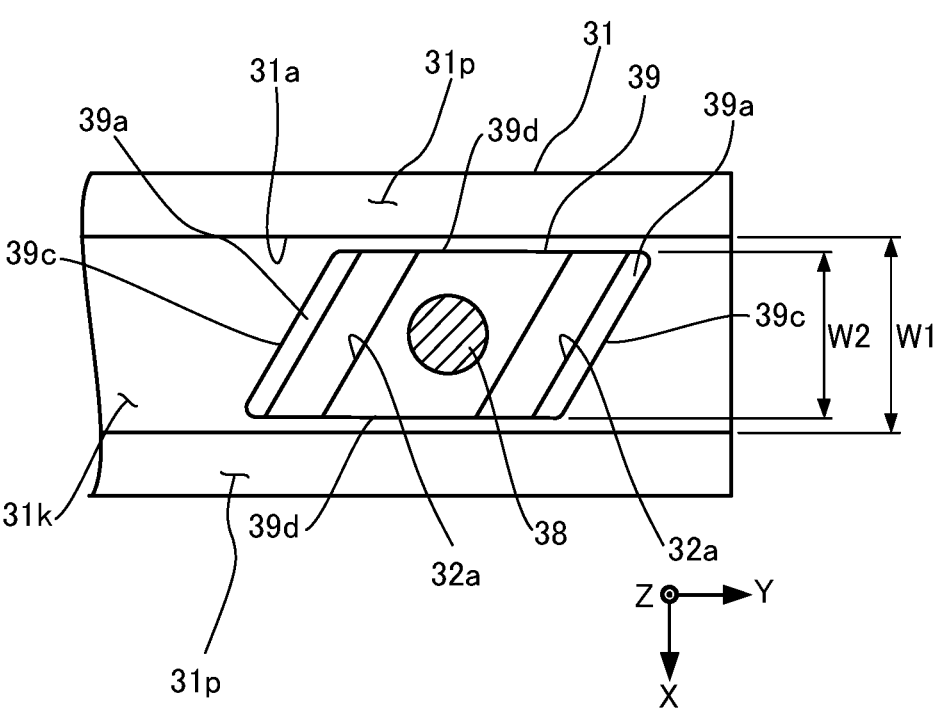
FIG. 10A is a diagram for a description of a relationship between the crosspiece member and a nut of the trestle according to Embodiment 1 and is a plan view when the nut is in a first state.
Figure 10B:
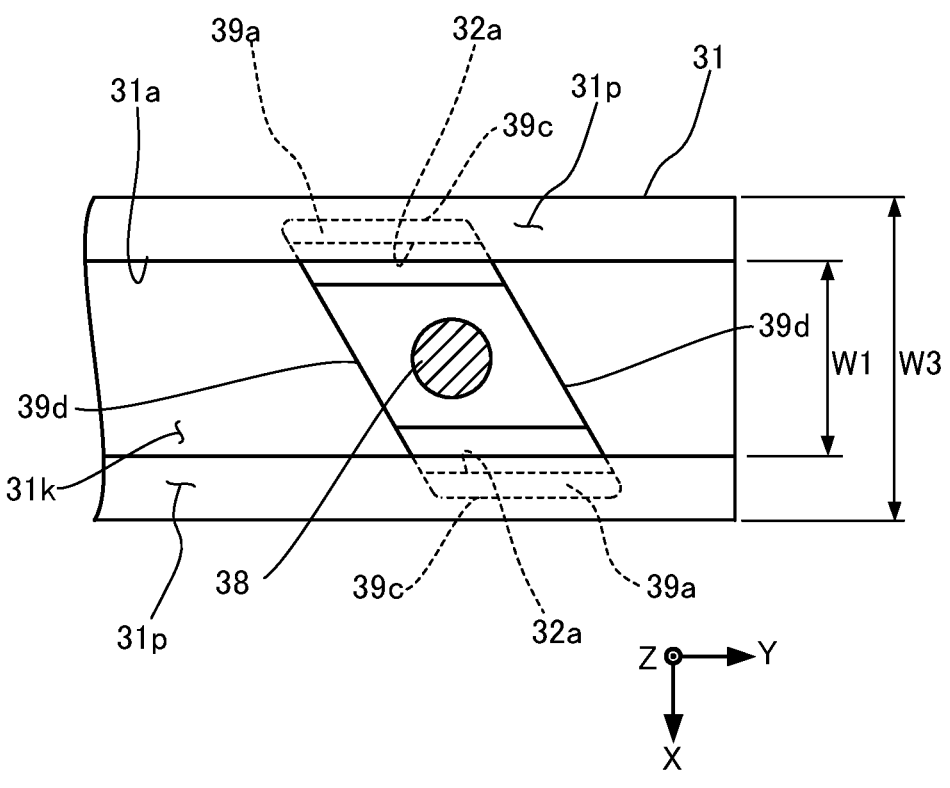
FIG. 10B is another diagram for a description of the relationship between the crosspiece member and the nut of the trestle according to Embodiment 1 and is a plan view when the nut is in a second state.

When viewed in plan from the +Z side, the nut 39 has a rhombic quadrilateral shape that has short sides 39*c* and 39*c* that are opposed to and parallel with each other and long sides 39*d* and 39*d* that are opposed to and parallel with each other, and at the center of the nut 39, a female screw 39*e* that screws onto the bolt 38 is formed, as illustrated in an enlarged view in FIG. 8. As illustrated in FIG. 10A, width W2 between the long sides 39*d* of the nut 39 is narrower than the width W1 of the opening 31*a* of the crosspiece member 31. On the other hand, as illustrated in FIG. 10B, width W3 between the short sides 39*c* of the nut 39 is wider than the width W1 of the opening 31*a* of the crosspiece member 31.

On a surface on the +Z side of the nut 39, groove portions 39*b* and 39*b* are formed on the inner sides with predetermined gaps interposed between the short sides 39*c* and 39*c*, which are opposed to each other, and the groove portions 39*b* and 39*b*, respectively. On the surface on the +Z side of the nut 39, third locking portions 39*a* and 39*a* that project in the +Z-direction from bottoms of the groove portions 39*b* and 39*b* are formed along the short sides 39*c* and 39*c*, respectively.

Figure 9B:
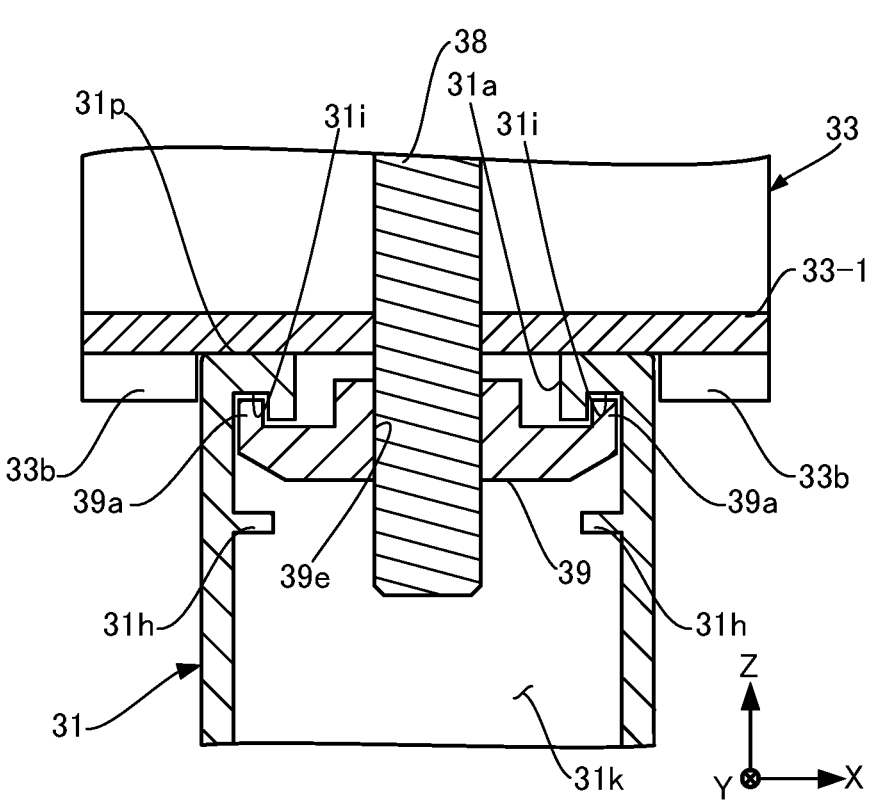
FIG. 9B is a cross-sectional view taken along the line b-b in FIG. 9A.

The nut 39 is housed in the housing space 31*k* inside the crosspiece member 31 while the nut 39 is screwed onto the bolt 38, as illustrated in FIG. 9B. When the nut 39 is housed in the housing space 31*k*, the nut 39 is first brought into a first state in which the long sides 39*d* and 39*d* are parallel with the Y-axis in which the opening 31*a* extends, as illustrated in FIG. 10A. Through this operation, the nut 39 can be inserted into the housing space 31*k* in the crosspiece member 31 through the opening 31*a*. By rotating the nut 39 having been inserted into the housing space 31*k* about the axis of the bolt 38, the nut 39 is brought into a second state in which the short sides 39*c* and 39*c* are parallel with the Y-axis in which the opening 31*a* extends, as illustrated in FIG. 10B. By fastening the bolt 38, the third locking portions 39*a* and 39*a* of the nut 39 can be fitted into the groove portions 31*i* and 31*i* formed on the crosspiece member 31, respectively, as illustrated in FIG. 9B.

Note that the attachment portion 35*b* for middle position illustrated in FIG. 1 does not include a second attachment portion 33, as described above. The configuration of the attachment portion 35*b* for middle position other than the non-existence of a second attachment portion 33 is the same as the configuration of the attachment portion 35*a* for end, and the attachment portion 35*b* for middle position includes a first attachment portion 32, a bolt 38, and a nut 39. The bolt 38 is inserted into only a bolt insertion hole 32-3*a* formed in the first attachment portion 32 and is screwed into the nut 39.

Figure 11:
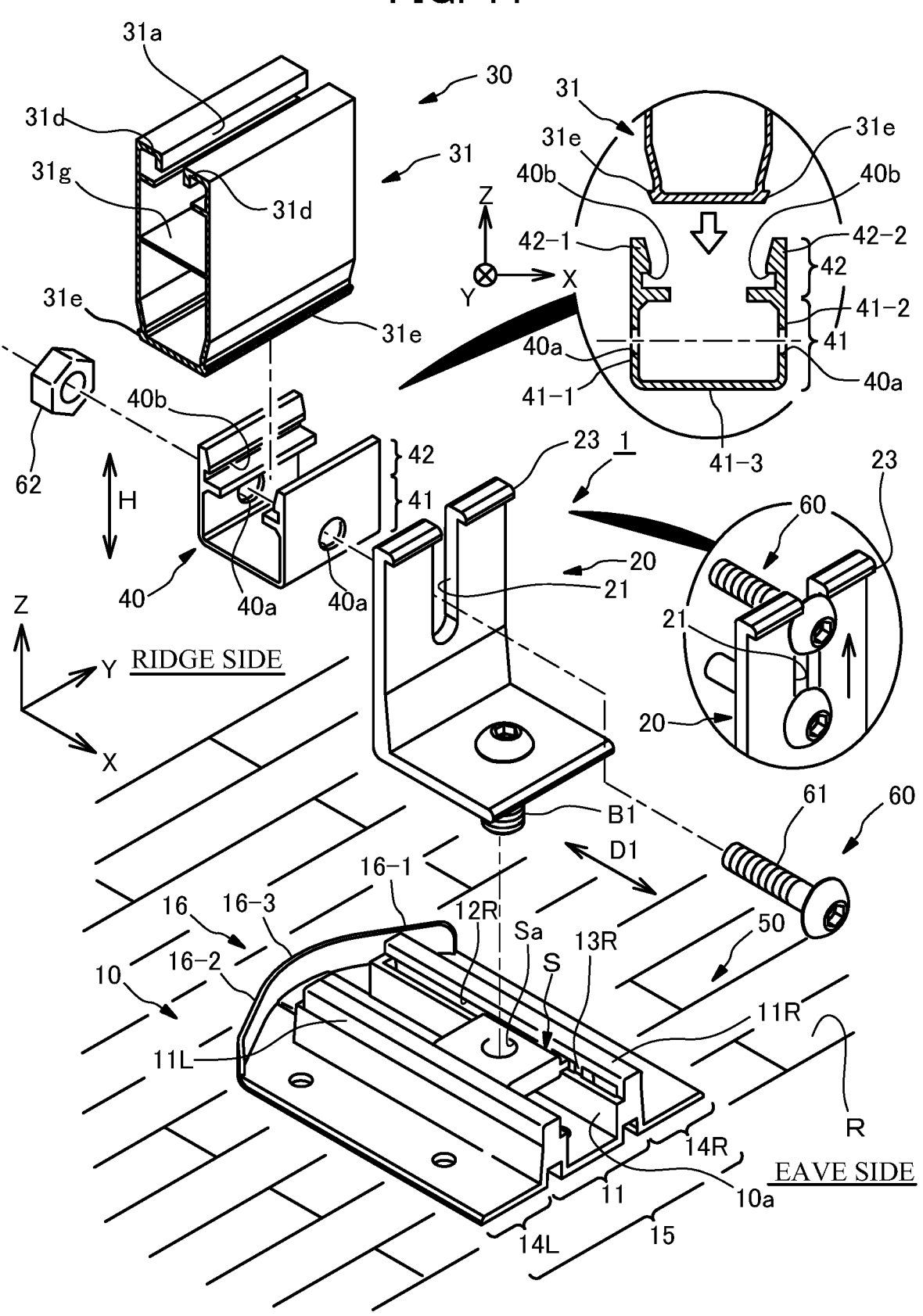
FIG. 11 is an exploded perspective view of the trestle according to Embodiment 1.

The receiving member 40 receives the fixing portion 30 from below, as illustrated in FIG. 11. The receiving member 40 is, for example, formed by extrusion molding metal. Specifically, the receiving member 40 is, for example, formed by extrusion-molding aluminum. The receiving member 40 includes a receiving member main body 41 to which the first fastener 60 is attached and a pinching portion 42 that is disposed at the top end of the receiving member main body 41.

In the receiving member main body 41, holes 40*a* (inserted portions) into which the first fastener 60 is inserted are formed. In addition, the receiving member main body 41 includes side wall portions 41-1 and 41-2 and a bottom plate portion 41-3.

Each of the side wall portions 41-1 and 41-2 is formed in a plate shape parallel with the YZ plane. The holes 40*a* are formed penetrating the side wall portions 41-1 and 41-2 in the X-axis direction. The side wall portion 41-2 among side wall portions 41-1 and 41-2 is a portion that is in contact with and fixed to the base unit 50 by the first fastener 60.

The bottom plate portion 41-3 is formed in a plate shape parallel with the XY plane. The bottom plate portion 41-3 connects bottom edges (edges on the −Z side) of the side wall portions 41-1 and 41-2 to each other.

The pinching portion 42 is a portion that pinches the bottom end of the crosspiece member 31. On the pinching portion 42, first locked portions 40*b* to which the first locking portions 31*e* of the crosspiece member 31 are locked are formed. The pinching portion 42 includes extended portions 42-1 and 42-2 that are extended upward (in the +Z-direction) from the top edges (edges on the +Z side) of the side wall portions 41-1 and 41-2 of the receiving member main body 41, respectively. On each of facing surfaces of the extended portion 42-1 and the extended portion 42-2 that face each other, one of the first locked portions 40*b* is formed.

The base unit 50 fixes the receiving member 40 in an adjustable manner in the height direction H from the roof surface R and also supports the fixing portion 30 via the receiving member 40, as illustrated in FIG. 1. The base unit 50 includes a base 10, a slide fitting S (a slide member), a support member 20, and a fastener B1 for support member attachment, as illustrated in FIG. 11.

The base 10 is, for example, formed of metal. Specifically, the base 10 is, for example, formed by die casting using a die. The base 10 includes a base main body 15 and a wall portion 16.

The base main body 15 is fixed to the roof surface R. In addition, on the base main body 15, a first groove 10a (a groove for support member fixing) that serves as a groove for fixing used to fix the support member 20 is formed. The base main body 15 includes a groove formation portion 11 on which the first groove 10a is formed and plate-shaped flange portions 14R and 14L that are formed in such a manner as to project in the +Y-direction and the −Y-direction from the groove formation portion 11, respectively.

On the groove formation portion 11, the first groove 10a is formed along a first direction D1 that is the same direction as the cave-ridge direction. The groove formation portion 11 includes a pair of side wall portions 11R and 11L that form the first groove 10a on the inner side of the side wall portions 11R and 11L.

In addition, on facing surfaces of the pair of side wall portions 11R and 11L, a pair of second grooves 12R and 12L into which portions of the slide fitting S are fitted are formed, respectively.

The second grooves 12R and 12L are formed in such a manner as to extend along the first direction D1 (the cave-ridge direction). In the second grooves 12R and 12L, slide restricting portions 13R and 13L are formed, respectively. Note that in Embodiment 1, two slide restricting portions 13R and 13L are formed because the slide restricting portions 13R and 13L are formed in the second grooves 12R and 12L, respectively. However, the present disclosure is not limited to the configuration. Only one of the slide restricting portions 13R and 13L may be formed in a corresponding one of the second grooves 12R and 12L.

In the flange portions 14R and 14L, holes 14a-1 for fastener insertion that are circular holes into which fasteners B2 for base attachment (FIG. 2) to attach the base 10 are inserted are formed in a penetrating manner in the Z-axis direction.

The wall portion 16 is disposed at an edge close to the ridge (on the −X side) on the base main body 15 and is formed projecting upward (in the +Z-direction) with respect to the XY plane, as illustrated in FIG. 11. The wall portion 16 is integrally formed with the base main body 15 by casting. The wall portion 16 is used to, for example, prevent rainwater flowing from the ridge side from reaching fasteners inserted into the holes 14a-1 for fastener insertion. On the wall portion 16, a first inclined surface 16-1, a second inclined surface 16-2, and a protruding surface 16-3 are formed.

The base 10 that is configured as described above is produced in such a manner that the base main body 15 and the wall portion 16 are integrally formed by, for example, casting in which at least two dies are opened in the up and down directions (the +Z-direction and the −Z-direction). However, without being limited to such a configuration, any production method other than casting may be applicable as long as the production method is a method that enables the base main body 15 and the wall portion 16 to be integrally formed. In addition, the base 10 is preferably produced by die casting among the types of casting. However, the present disclosure is not limited to the configuration. The base 10 may be produced by a casting method other than die casting, such as sand mold casting, plaster mold casting, resin mold casting, and lost wax casting.

The slide fitting S is fitted into the first groove 10a of the base 10 in a slidable manner in the first direction D1, as illustrated in FIG. 3. The slide fitting S performs positioning of the solar panels P in the first direction D1 by being attached to the base 10 at an arbitrary position in the first direction D1. The slide fitting S is formed of, for example, metal and specifically, is formed of a metal that is the same material as the material of the base 10. In the slide fitting S, a screw hole Sa is formed.

Into the screw hole Sa, the fastener B1 for support member attachment is screwed, as illustrated in FIG. 11, and the inner circumferential surface of the screw hole Sa is formed in a female screw surface. The screw hole Sa is formed in a penetrating manner in the Z-axis direction.

On the slide fitting S, a pair of not-illustrated fitting portions are formed in addition to the screw hole Sa. The fitting portions are portions that are fitted into the second grooves 12R and 12L, which are formed on the side wall portions 11R and 11L that the base 10 includes. Each of the fitting portions has a YZ cross section thereof formed in an L-shape.

The support member 20 is an L-shaped angle fitting that has an XZ cross section formed in an L-shape and supports the receiving member 40 at a vicinity of the upper end of the L-shape, as illustrated in FIG. 11. The support member 20 is fixed to the slide fitting S of the base unit 50. On the support member 20, a groove 21 for height direction adjustment (a receiving member attachment portion) and projecting portions 23 are formed.

The groove 21 for height direction adjustment (the receiving member attachment portion) is a groove that extends long in the height direction H. Into the groove 21 for height direction adjustment, the first fastener 60 is inserted. The groove 21 for height direction adjustment is used to adjust a position in the height direction H of the receiving member 40.

The projecting portions 23 project in the +X-direction from an upper end (an end on the +Z side) of the support member 20. The projecting portions 23 prevent the first fastener 60 from coming off the groove 21 for height direction adjustment upward (in the +Z-direction) by a bolt head that the first fastener 60 includes being caught by the projecting portions 23. Note that in Embodiment 1, the projecting portions 23 project in the +X-direction from the upper end (the end on the +Z side) of the support member 20. However, the present disclosure is not limited to the configuration. The projecting portions 23 may project in the −X-direction, which is opposite to the +X-direction, from the upper end (the end on the +Z side) of the support member 20. However, when the projecting portions 23 project in the −X-direction, there is a risk that the projecting portions 23 interfere with the receiving member 40 attached to the support member 20. Thus, the projecting portions 23 preferably project in the +X-direction from the upper end (the end on the +Z side) of the support member 20.

The fastener B1 for support member attachment is formed by, for example, a bolt or a screw, as illustrated in FIG. 11. The fastener B1 for support member attachment is screwed into the screw hole Sa of the slide fitting S. The fastener B1 for support member attachment is used to attach the support member 20 to the slide fitting S.

The first fastener 60 includes a bolt 61 and a nut 62. The bolt 61 is formed by, for example, a bolt or a screw. In Embodiment 1, the bolt 61 of the first fastener 60 is a component that is to be screwed into the nut 62. However, the present disclosure is not limited to the configuration. For example, the holes 40*a* of the receiving member 40 may be formed in screw holes and the bolt 61 may be a component that is to be screwed into the holes 40*a*. In this case, the nut 62 can be omitted, and the first fastener 60 includes only the bolt 61.

A construction method of the trestle 1 that is configured as described above is described using the drawings.

When the trestle 1 and solar panels P are installed on the roof surface R of a building, a worker who installs the trestle 1 on the roof surface R first attaches the base 10, the slide fitting S, and the support member 20 in this order on the roof surface R, as illustrated in FIG. 11. The base 10 is fixed to the roof surface R by the fasteners B2 for base attachment (FIG. 2). The support member 20 is fixed to the slide fitting S by the fastener B1 for support member attachment.

Succeedingly, the worker temporarily fixes the receiving member 40 to the support member 20, using the first fastener 60.

Succeedingly, the worker fits the crosspiece member 31 to which no solar panel P has been attached into the temporarily fixed receiving member 40 from the +Z side (the upper side). When the crosspiece member 31 is fitted into the receiving member 40, the first locking portions 31*e* of the crosspiece member 31 are locked to the first locked portions 40*b* of the receiving member 40.

Succeedingly, the worker adjusts a height level from the roof surface R to the top end of the crosspiece member 31 in such a way that the height level coincides with a height level that the worker desires. Then, the worker fixes the receiving member 40 to the support member 20, using the first fastener 60.

Succeedingly, the worker arranges two attachment portions 35*a* for end and an attachment portion 35*b* for middle position illustrated in FIG. 1 on the upper surface of the crosspiece member 31. Specifically, the worker rotates the nut 39 of each of the attachment portions 35*a* for end and the attachment portion 35*b* for middle position, and aligns the nut 39 in such a manner that the long sides 39*d* and 39*d* are parallel with the Y-axis, as illustrated in FIG. 10A. Through this operation, the worker is able to insert the nut 39 into the housing space 31*k* in the crosspiece member 31 through the opening 31*a*.

Succeedingly, the worker, by rotating each nut 39 having been inserted into the housing space 31*k*, aligns the nut 39 in such a manner that the short sides 39*c* and 39*c* are parallel with the Y-axis, as illustrated in FIG. 10B. In this way, the worker is able to dispose each nut 39 in a bridging manner between the second projecting portions 31*h* illustrated in FIG. 9B, and temporarily places the nut 39 on the second projecting portions 31*h*.

Succeedingly, when arranging each of the attachment portions 35*a* for end, the worker inserts the projecting plate portion 32-6 of the first attachment portion 32 into the insertion groove 33*a* formed on the second attachment portion 33, as illustrated in FIG. 9A, and combines the first attachment portion 32 and the second attachment portion 33. Then, the worker, while sliding the nut 39 along the Y-axis direction inside the housing space 31*k*, arranges the attachment portion 35 at a desired position. Then, the worker places the bottom wall portion 33-1 of the second attachment portion 33 on the placement surfaces 31*p* of the crosspiece member 31 and puts the first attachment portion

32 and the second attachment portion 33 that are combined with each other on the crosspiece member 31.

Succeedingly, the worker pinches solar panels P, using the attachment portions 35*a* for end and the attachment portion 35*b* for middle position that are arranged on the crosspiece member 31 and temporarily fixes the solar panels P. Specifically, the worker pinches a solar panel P illustrated on the right-hand side in FIG. 4 between the extended portion 32-5 of the attachment portion 35*a* for end and the placement surface 31*p* of the crosspiece member 31 and hooks the second locking portions 33*b* of the attachment portion 35*a* for end on the second surface P2 of the solar panel P. In addition, the worker pinches the solar panel P illustrated on the right-hand side in FIG. 4 between the extended portion 32-4 of the attachment portion 35*b* for middle position and the placement surface 31*p* of the crosspiece member 31. Through this operation, the worker is able to temporarily fix the solar panel P illustrated on the right-hand side in FIG. 4.

Note that the worker likewise temporarily fixes a solar panels P illustrated on the left-hand side in FIG. 4, using the other attachment portion 35*a* for end and the attachment portion 35*b* for middle position.

Finally, the worker fully tightens the bolts 38 of the attachment portions 35*a* for end and the attachment portion 35*b* for middle position and fixes the solar panels P to the trestle 1.

Through the above operation, work to install the trestle 1 and the solar panels P on the roof surface R of the building is completed.

According to the trestle 1 according to Embodiment 1, each of the attachment portions 35*a* for end to attach a solar panel P to the crosspiece member 31 includes the second attachment portion 33 that is placed on the crosspiece member 31 and the first attachment portion 32 that clamps the solar panel P between the first attachment portion 32 and the crosspiece member 31 and is combined with the second attachment portion 33 in a slidable manner in a direction in which the first attachment portion 32 presses the solar panel P. Because of this configuration, it is possible to prevent the first attachment portion 32 from falling over by the second attachment portion 33 placed on the crosspiece member 31 and stabilize an attitude of the attachment portion 35. Stabilizing the attachment portion 35*a* for end as described above facilitates attachment work of solar panels P and enables efficiency of attachment work of a panel to be improved.

Figure 12:
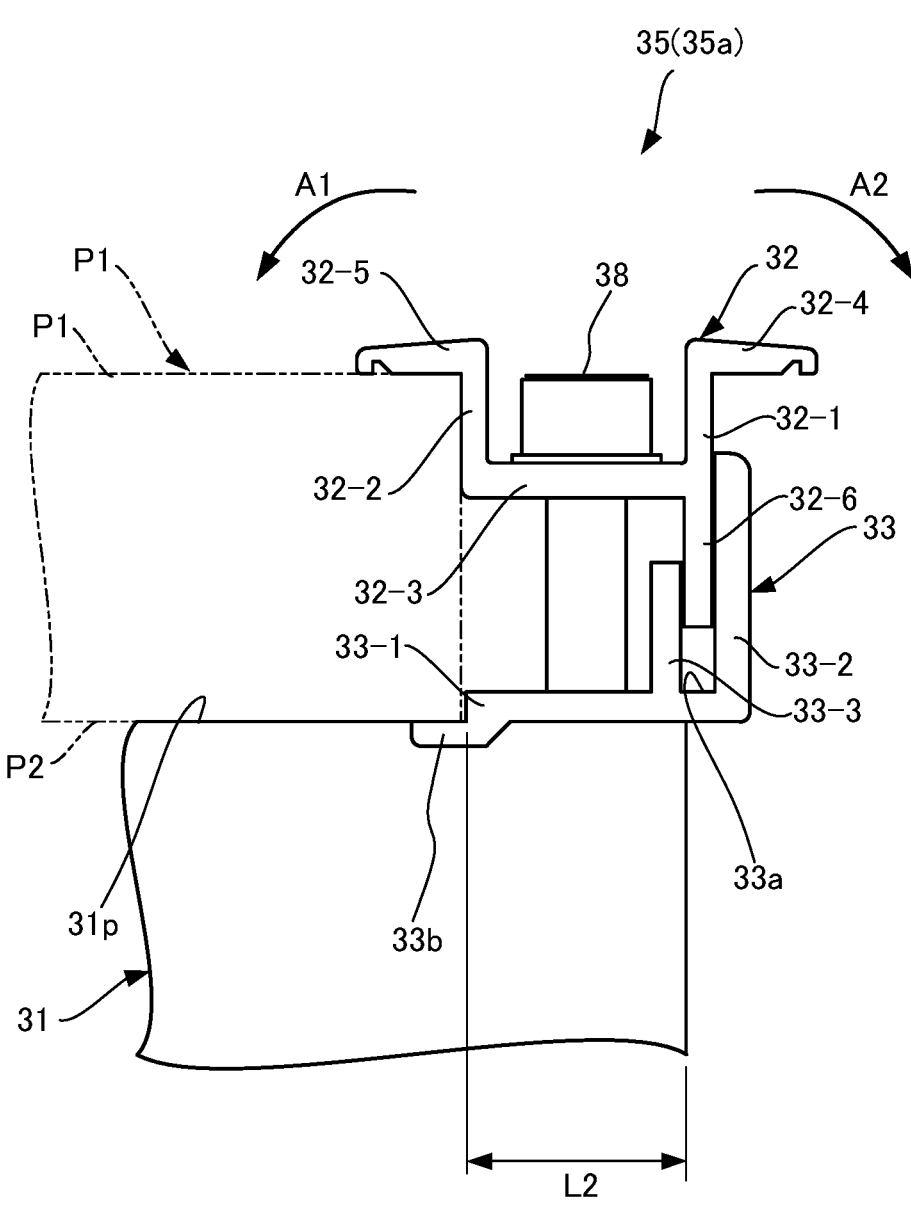
FIG. 12 is a side view illustrating a manner in which a solar panel is fixed by the attachment portion of the trestle according to Embodiment 1.

The reason why each of the attachment portions 35*a* for end is stabilized is described more specifically. As illustrated in FIG. 12, on the second attachment portion 33, the bottom wall portion 33-1 that is placed on the placement surface 31*p* of the crosspiece member 31 is formed. Length L2 over which the placement surface 31*p* and the bottom wall portion 33-1 come into contact with each other can be set to an arbitrary length, and a sufficient length that enables the attitude of the attachment portion 35*a* for end to be stabilized can thus be secured. Since the first attachment portion 32 is combined with the second attachment portion 33 the attitude of which is stabilized as described above, it becomes possible to prevent the attachment portion 35*a* for end from falling over in a direction illustrated by an arrow A1 or falling over in a direction illustrated by an arrow A2.

In addition, the first attachment portion 32 and the second attachment portion 33 are combined in a slidable manner in a direction parallel with a pressing direction of a solar panel P by inserting the projecting plate portion 32-6 formed on the first attachment portion 32 into the insertion groove 33*a* formed on the second attachment portion 33. Because of this configuration, an axial force introduced into the bolt 38 can be smoothly transmitted to the first attachment portion 32, and a solar panel P can be clamped between the first attachment portion 32 and the crosspiece member 31. Because of this capability, efficiency of attachment work of a panel can be improved.

In addition, with regard to the width of each of the nuts 39, the nut 39 includes a portion the width of which is wider than the width of the opening 31*a* formed in the crosspiece member 31 and a portion the width of which is narrower than the width of the opening 31*a*, as described with reference to FIGS. 10A and 10B. Because of this configuration, by housing the nut 39 in the housing space 31*k* of the crosspiece member 31 and subsequently rotating the nut 39 about the axis of the bolt 38, the nut 39 can be hooked on the crosspiece member 31. Therefore, subsequent tightening of the bolt 38 can be easily performed, and efficiency of attachment work of a panel can be improved.

In addition, as illustrated in FIG. 9B, the third locking portions 39*a* and 39*a* that are fitted into the groove portions 31*i* and 31*i* formed on the crosspiece member 31, respectively are formed on each of the nuts 39. Because of this configuration, the nut 39 can be prevented from rotating at the time of tightening of the bolt 38, and tightening of the bolt 38 can be easily performed.

In addition, as illustrated in FIG. 3, on the bottom wall portion 33-1 of the second attachment portion 33, the notch 3 that is cut out inward from the center of the side on the −Y side is formed to enable the bolt 38 to be inserted. Because of this configuration, even after the attachment portion 35*b* for middle position that does not include a second attachment portion 33 is arranged on the crosspiece member 31, a second attachment portion 33 can be additionally attached by inserting the bolt 38 into the notch 3. Since inclusion or non-inclusion of the second attachment portion 33 can be selected as needed basis as described above, efficiency of attachment work of a panel can be improved.

In addition, on the second attachment portion 33, the second locking portions 33*b* that extend out in such a manner as to be stepped down from the bottom wall portion 33-1 and come into contact with the second surface P2 of a solar panel P are formed. Because of this configuration, even when a force is exerted on the attachment portion 35*a* for end in a direction illustrated by an arrow A2 in FIG. 12, the second locking portions 33*b* are caught by the solar panel P, which enables the attachment portion 35*a* for end to be prevented from falling over. Because of this capability, efficiency of attachment work of a panel can be improved.

In addition, the second locking portions 33*b* that are stepped down from the bottom wall portion 33-1 are arranged on both sides of the crosspiece member 31, as illustrated in FIG. 3. Because of this configuration, even when a force is exerted on the second attachment portion 33 in a direction along the X-axis, the second locking portions 33*b* are caught by the side surfaces of the crosspiece member 31, which enables the attitude of the second attachment portion 33 to be maintained. Because of this capability, efficiency of attachment work of a panel can be improved.

Embodiment 2

Figure 13:
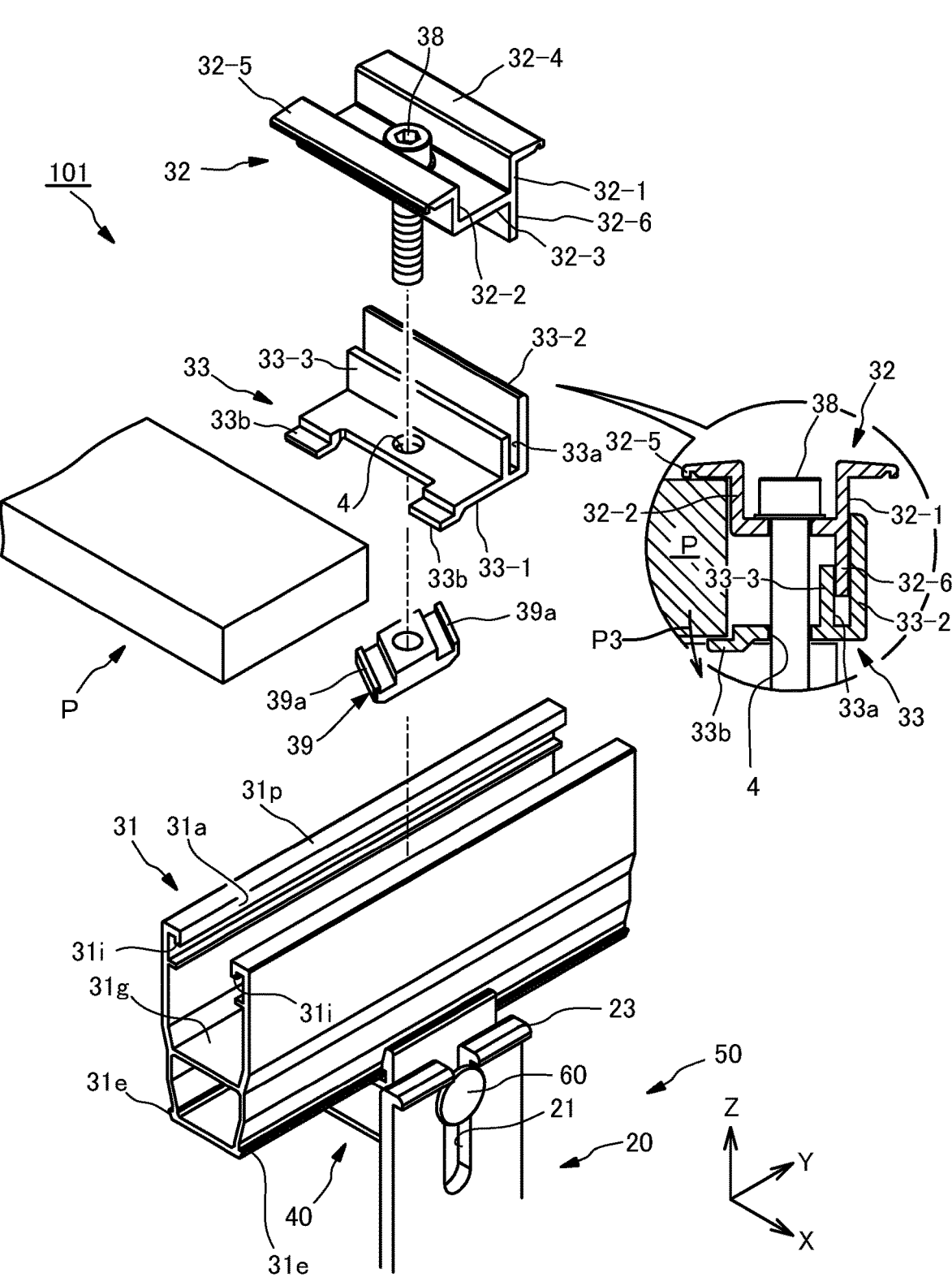
FIG. 13 is an exploded perspective view of a trestle according to Embodiment 2.

In Embodiment 1 described above, on the bottom wall portion 33-1 of the second attachment portion 33, the notch 3 into which a shaft portion of the bolt 38 is inserted is formed, as illustrated in FIG. 7. However, the present disclosure is not limited to the configuration. As illustrated in FIG. 13, on a bottom wall portion 33-1 of a second attachment portion 33, a bolt hole 4 into which a shaft portion of a bolt 38 is inserted may be formed in place of a notch 3. Note that many constituent elements of Embodiment 2 are common to constituent elements of Embodiment 1. Therefore, common constituent elements are provided with the same reference signs, and overlapping description thereof is omitted.

In a trestle 101 according to Embodiment 2, compared with the trestle 1 of Embodiment 1, when the second attachment portion 33 receives a force P3 from a solar panel P, an inner surface of the bolt hole 4 comes into contact with the bolt 38. The second attachment portion 33 being caught by the bolt 38 as described above enables a first attachment portion 32 and the second attachment portion 33 to be stably arranged with respect to a crosspiece member 31 in the trestle 101. As a consequence, the trestle 101 is capable of stabilizing fixing of a solar panel P to the crosspiece member 31.

In addition, with respect to the trestle 101 according to Embodiment 2, the same advantageous effects as those of Embodiment 1 can also be achieved.

Note that in Embodiment 2, the bolt hole 4 is a circular hole formed in a perfect circle. However, the present disclosure is not limited to the configuration. The bolt hole 4 may be a hole having a shape other than a circular hole formed in a perfect circle.

Embodiment 3

Figure 14A:
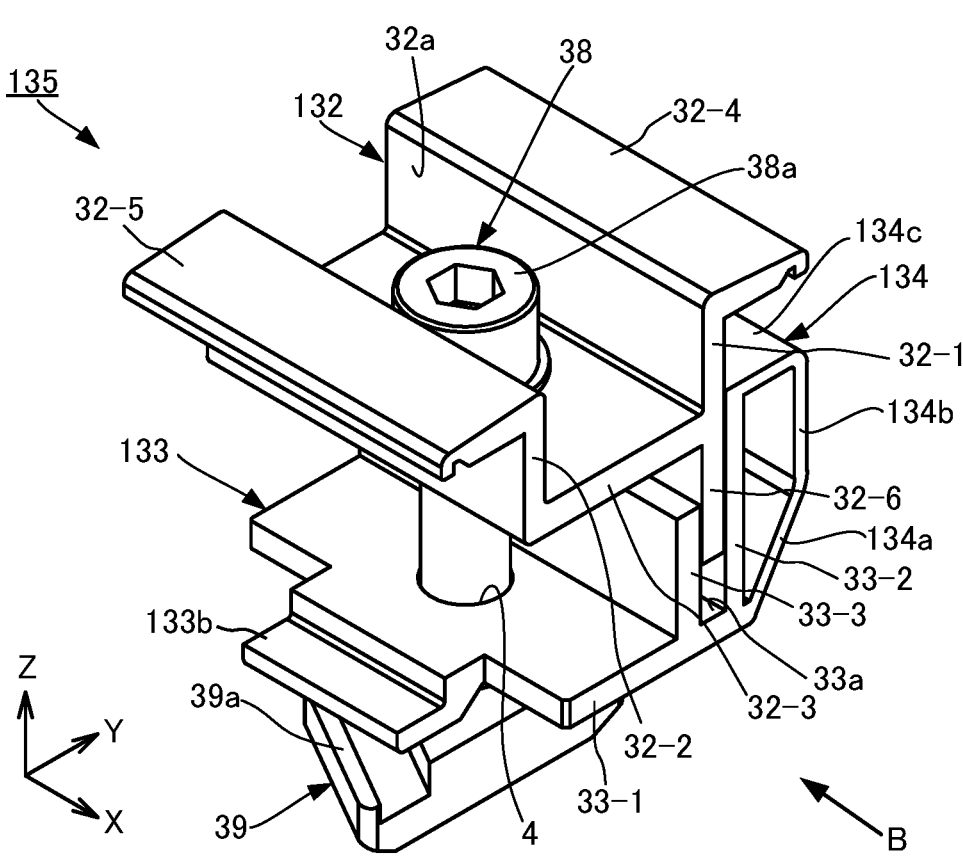
FIG. 14A is a perspective view of an attachment portion of a trestle according to Embodiment 3.
Figure 16:
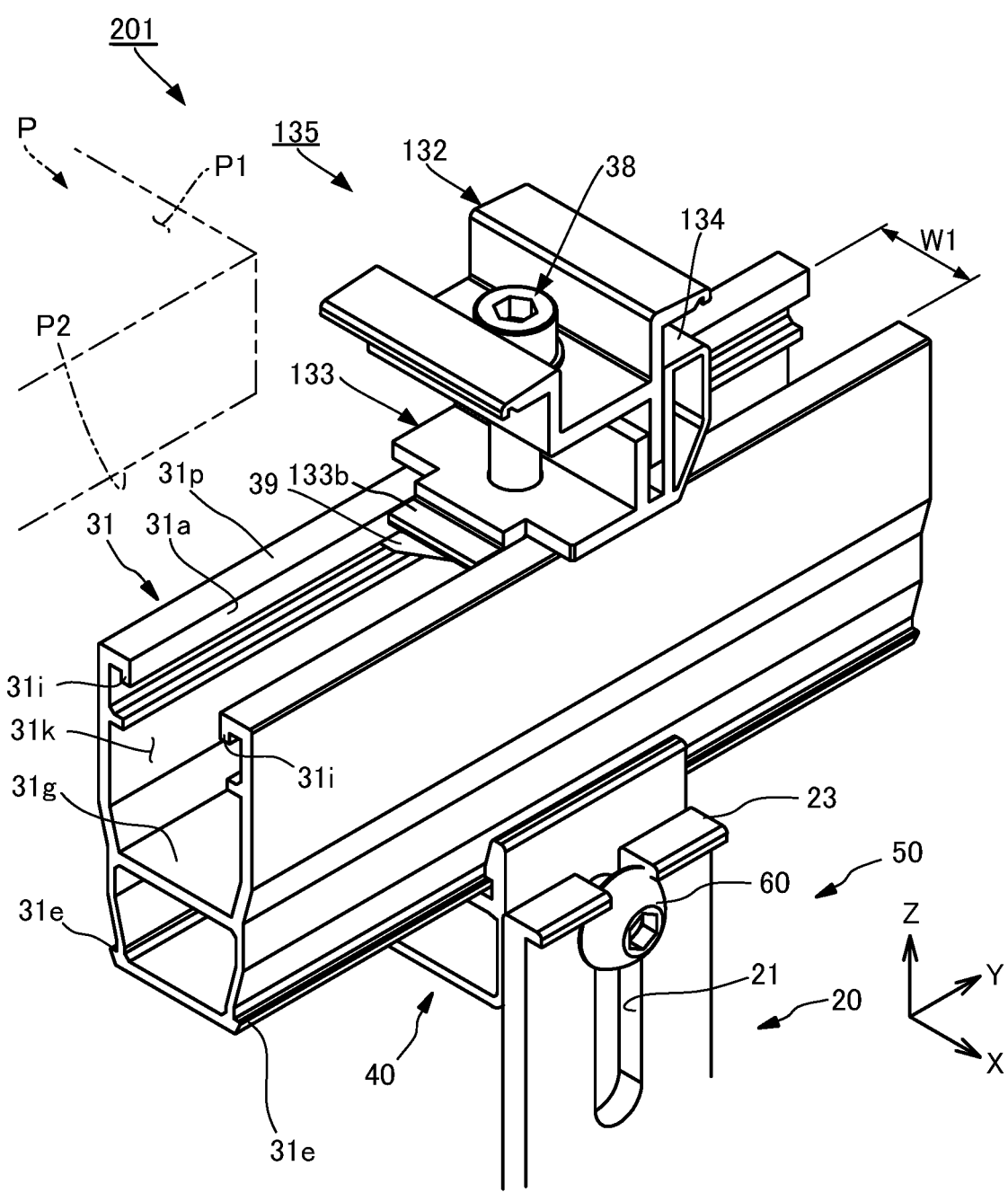
FIG. 16 is a perspective view illustrating a portion of the trestle according to Embodiment 3.

Lengths in the X-axis direction of a first attachment portion 132 and a second attachment portion 133 of a trestle 201 according to Embodiment 3 are shorter than (in other words, approximately two-thirds of) the lengths of the first attachment portion 32 and the second attachment portion 33 in Embodiment 1. Therefore, as illustrated in FIG. 16, the amounts of projection of the first attachment portion 132 and the second attachment portion 133 from the crosspiece member 31 in a direction parallel with the X-axis are small. In the present embodiment, as illustrated in FIG. 14A, a second locking portion 133*b* is extended out from the center of a side on the −Y side of the bottom wall portion 33-1 toward the −Y side.

Figure 14B:
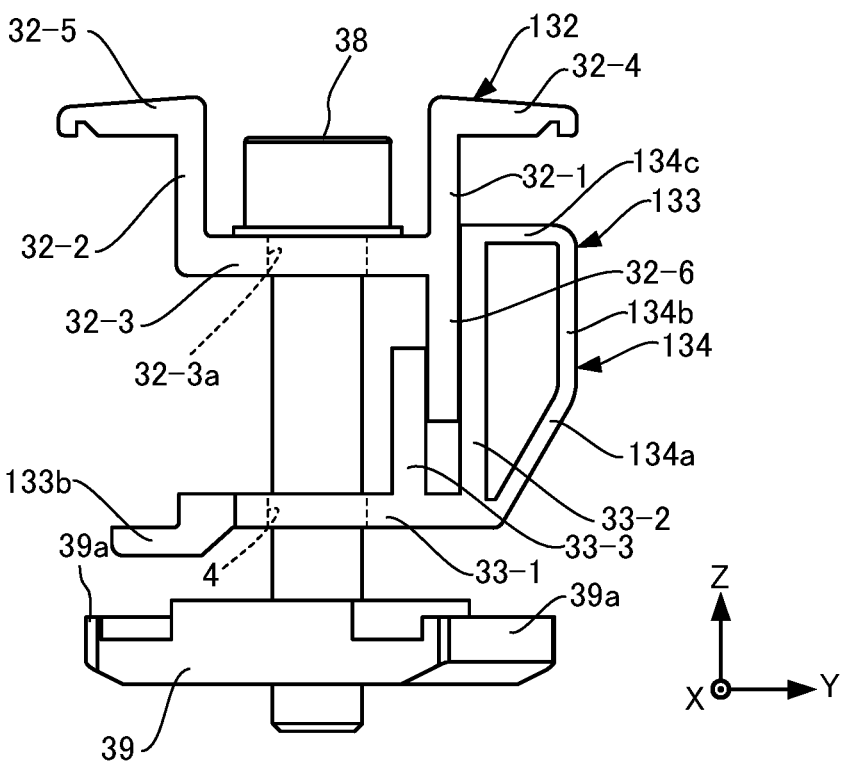
FIG. 14B is a diagram illustrating the attachment portion of the trestle according to Embodiment 3 and is a side view when viewed from an arrow B in FIG. 14A.

A shape and size of a cross section when the first attachment portion 132 is sectioned in a direction orthogonal to the X-axis are the same as the shape and size of a cross section of the first attachment portion 32 of Embodiment 1. At the center of a joining plate portion 32-3, a bolt insertion hole 32-3*a* (FIG. 14B) into which a bolt 38 is inserted is formed.

Figure 15:
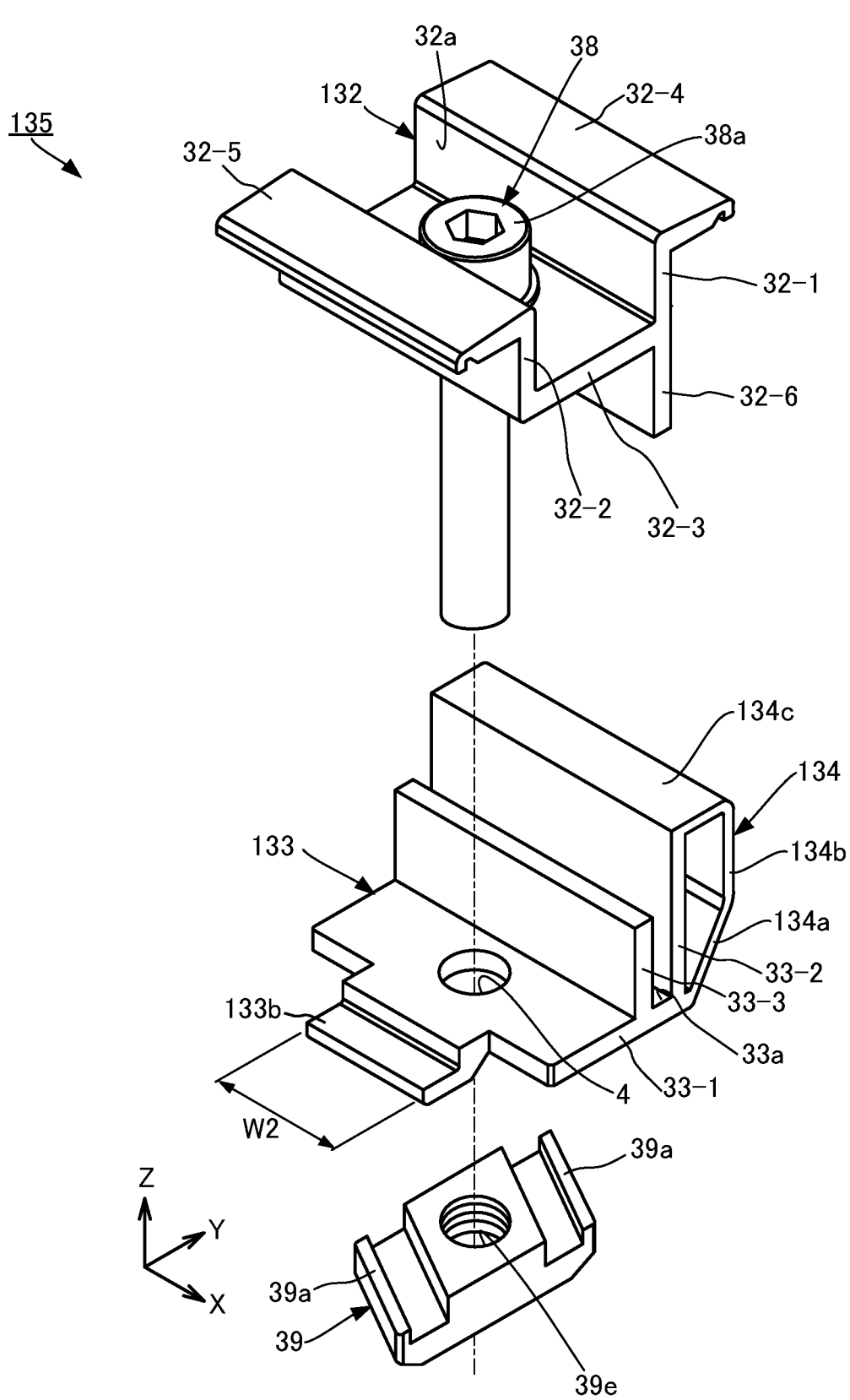
FIG. 15 is an exploded perspective view of the attachment portion of the trestle according to Embodiment 3.

The length in the X-axis direction of the second attachment portion 133 is shorter than (in other words, approximately two-thirds of) the length of the second attachment portion 33 in Embodiment 1. On the bottom wall portion 33-1, a bolt hole 4 into which the bolt 38 is inserted is formed and the second locking portion 133*b* is also provided in a protruding manner from the center of the side on the −Y side, as illustrated in FIG. 15. The second locking portion 133*b* may, as with the second locking portions 33*b* of Embodiment 1, be formed in such a manner as to be stepped down from the bottom wall portion 33-1. In addition, width W2 in the X-axis direction of the second locking portion 133*b* is narrower than width W1 of a slit-shaped opening 31*a* of the crosspiece member 31 (FIG. 16). Because of this configuration, as illustrated in FIG. 16, when the second locking portion 133*b* is placed on a placement surface 31*p* of the crosspiece member 31, the second locking portion 133*b* passes the opening 31*a* and is housed in a housing space 31*k* of the crosspiece member 31.

In addition, the second attachment portion 133 includes a trapezoidal cylindrical portion 134 a cross section of which when sectioned in a direction orthogonal to the X-axis is a trapezoidal shape at an edge on the +Y side, as illustrated in FIG. 15. The trapezoidal cylindrical portion 134 includes a first rising portion 33-2 that defines a portion of an insertion groove 33*a*, an inclined wall portion 134*a* that extends in an inclined direction from an edge side on the +Y side of the bottom wall portion 33-1, a side wall portion 134*b* that extends from the inclined wall portion 134*a*, and an upper plate portion 134*c* that connects the first rising portion 33-2 and the side wall portion 134*b*. Among the constituent elements of the trapezoidal cylindrical portion 134, the first rising portion 33-2 and the side wall portion 134*b* form base portions of the trapezoidal cylindrical portion 134. In addition, the inclined wall portion 134*a* and the upper plate portion 134*c* form leg portions of the trapezoidal cylindrical portion 134. The upper plate portion 134*c* is orthogonal to the first rising portion 33-2 and the side wall portion 134*b*.

According to the trestle 201 according to Embodiment 3, the second locking portion 133*b* arranged in the opening 31*a* of the crosspiece member 31 is hooked on a second surface P2 of a solar panel P. Because of this configuration, an attachment portion 135 that is arranged on the crosspiece member 31 can be prevented from falling over, and efficiency of attachment work of a panel can be improved.

In addition, forming the trapezoidal cylindrical portion 134 at the edge on the +Y side of the second attachment portion 133 facilitates grasping of the second attachment portion 133. Because of this configuration, even after the first attachment portion 132 and the second attachment portion 133 are combined, it is possible to, by grasping the trapezoidal cylindrical portion 134, bring the attachment portion 135 into a desired attitude or move the attachment portion 135, and efficiency of attachment work of a panel can be improved.

In addition, reducing the length in the X-axis direction of the attachment portion 135 enables reduction in material cost to be achieved.

In addition, with respect to the trestle 201 according to Embodiment 3, the same advantageous effects as those of Embodiments 1 and 2 can be achieved.

Embodiment 4

Figure 17A:
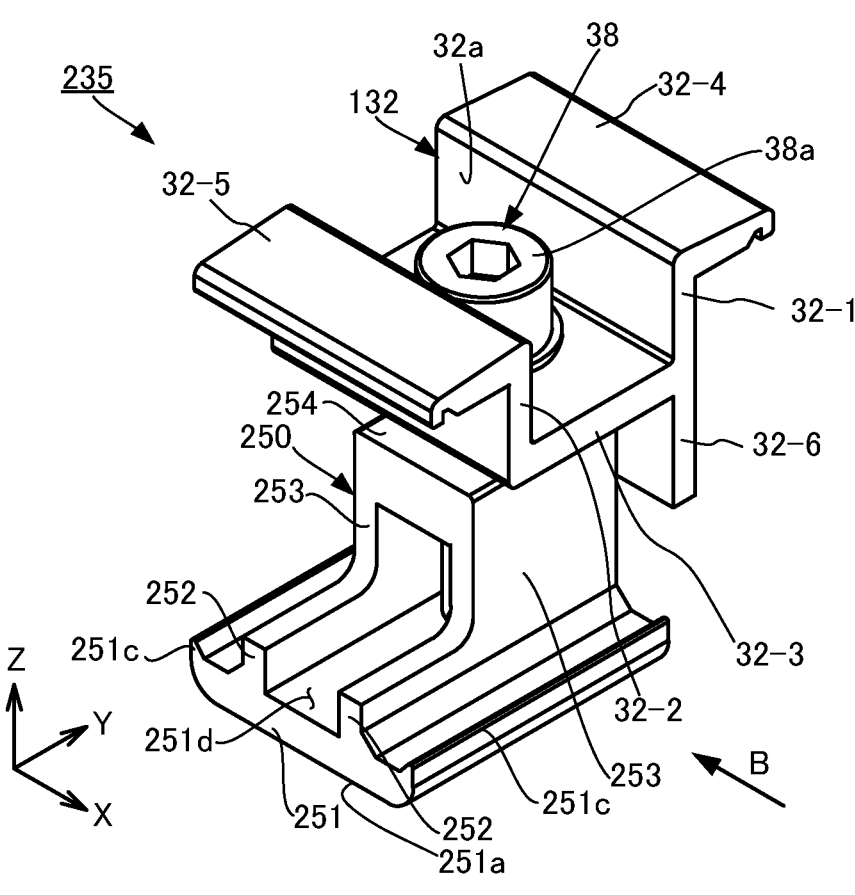
FIG. 17A is a perspective view of an attachment portion of a trestle according to Embodiment 4.
Figure 17B:
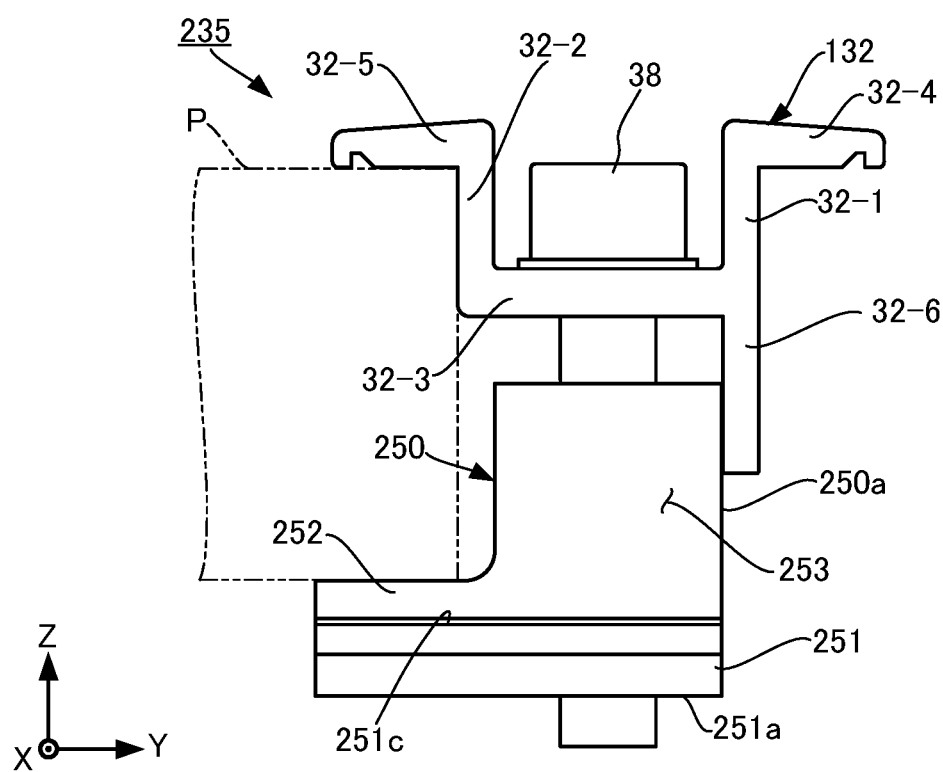
FIG. 17B is a diagram illustrating the attachment portion of the trestle according to Embodiment 4 and is a side view when viewed from an arrow B in FIG. 17A.
Figure 19:
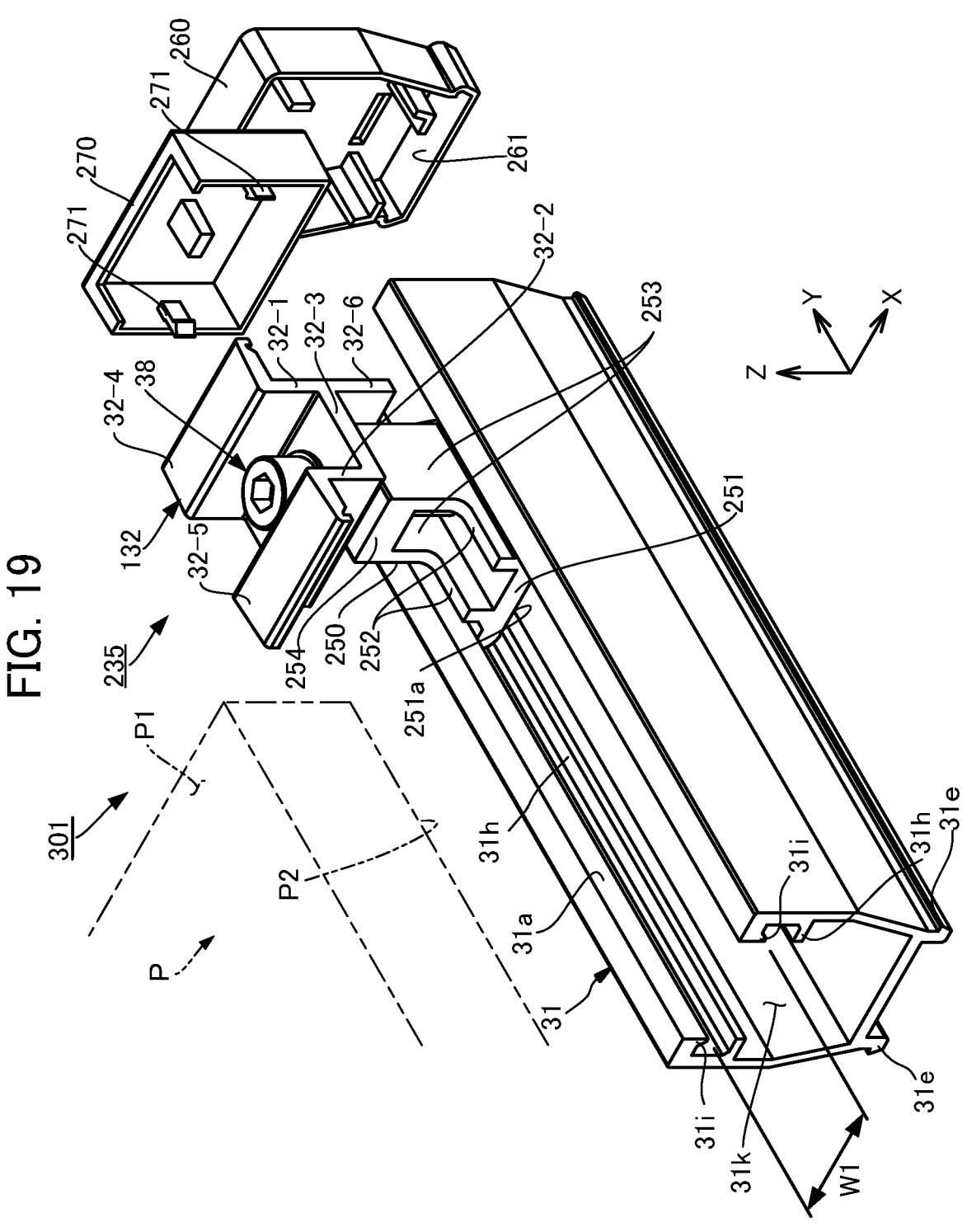
FIG. 19 is a perspective view of the trestle according to Embodiment 4.

In the above-described embodiments, the description was made assuming that the attachment portion 35 includes the second attachment portion 33 and the nut 39 that are independent of each other, as illustrated in, for example, FIG. 7. In contrast, a trestle 301 according to Embodiment 4 includes a second attachment portion 250 that has a function of a second attachment portion 33 and a function of a nut 39 at the same time, as illustrated in FIG. 19. The second attachment portion 250 is used in combination with a first attachment portion 132, as illustrated in FIGS. 17A and 17B. Note that the first attachment portion 132 and a bolt 38 are the same as the first attachment portion 132 and the bolt 38 illustrated in FIG. 15.

Figure 18A:
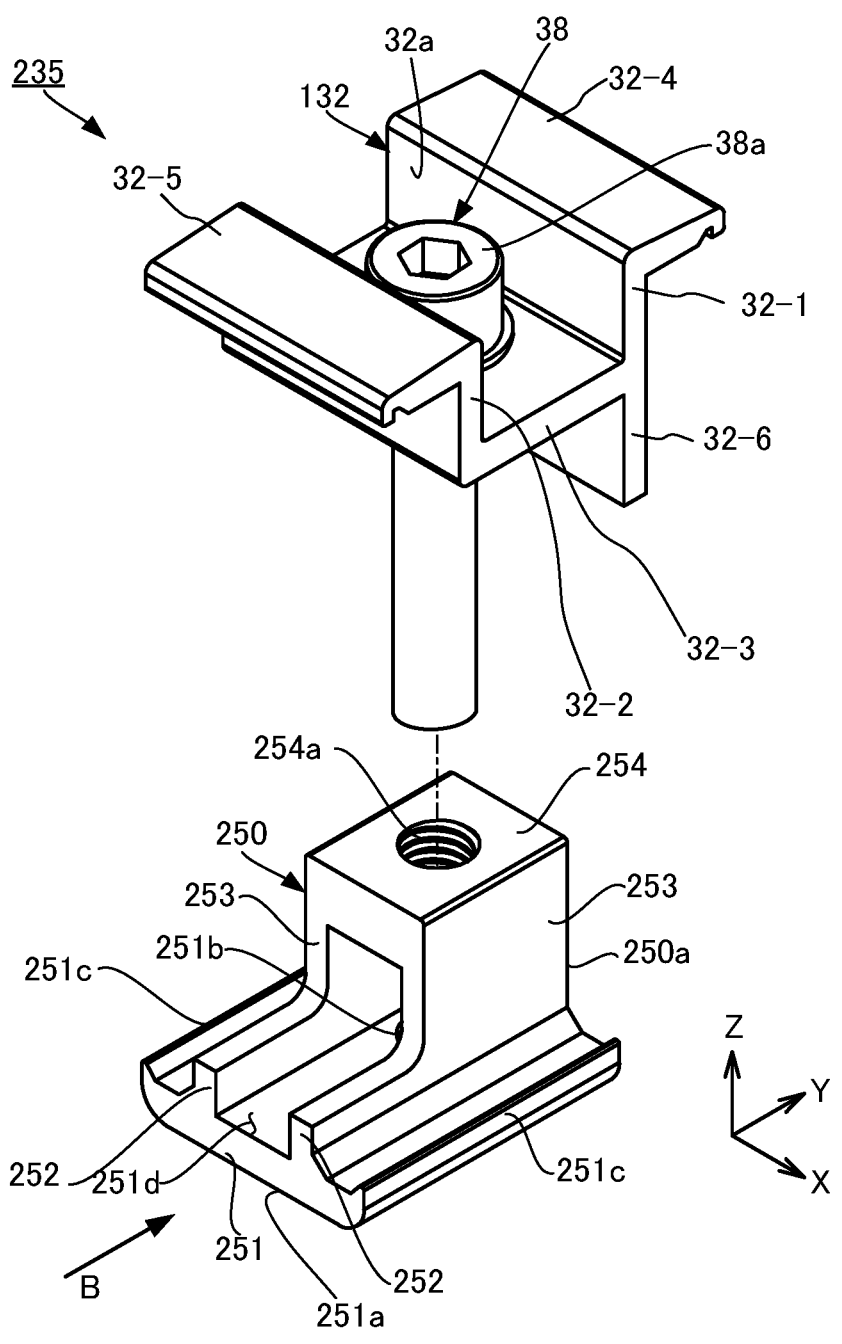
FIG. 18A is an exploded perspective view of the attachment portion of the trestle according to Embodiment 4.

The second attachment portion 250 includes a bottom wall portion 251, a pair of support portions 252 and 252 that rise from the bottom wall portion 251 and extend along the Y-axis, a pair of side wall portions 253 and 253 that are continuously formed along the Y-axis direction from the pair of support portions 252 and 252, respectively and the height of which is higher than the support portions 252 and 252, and an upper plate portion 254 that connects edge sides on the +Z side of the side wall portions 253 and 253 to each other, as illustrated in FIG. 18A.

Figure 18B:
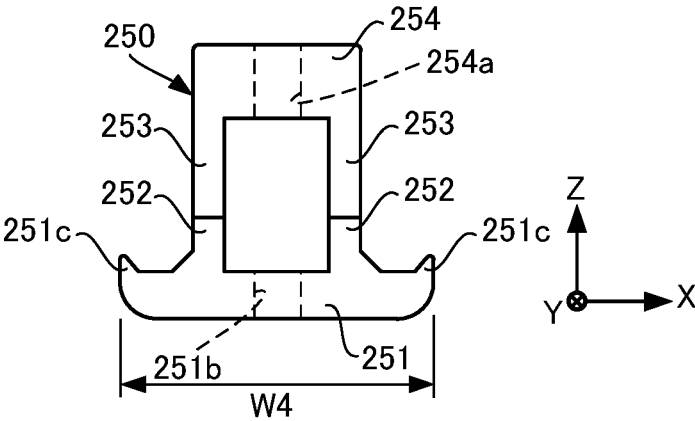
FIG. 18B is a diagram illustrating the attachment portion of the trestle according to Embodiment 4 and is a side view of a second attachment portion when viewed from an arrow B in FIG. 18A.

The bottom wall portion 251 is formed in a substantially rectangular shape when viewed in plan from the +Z side. As illustrated in FIG. 19, when an attachment portion 235 is placed on a crosspiece member 31, the attachment portion 235 comes into contact with second projecting portions 31*h* of the crosspiece member 31 by a first surface 251*a* on the −Z side. In addition, in the bottom wall portion 251, a female screw 251*b* that is screwed onto the bolt 38 is formed in an area sandwiched by the side wall portions 253 and 253, as illustrated in FIGS. 18A and 18B. In addition, on the bottom wall portion 251, third locking portions 251*c* that project in the +Z-direction are formed along sides (sides on the +X side and −X side) extending parallel with the Y-axis.

The support portions 252 and 252 are portions that project to the +Z side from a second surface 251*d* on the opposite side to the first surface 251*a* of the bottom wall portion 251, as illustrated in FIG. 17A. The support portions 252 and 252 come into contact with a solar panel P to be placed, as illustrated in FIG. 17B. The support portions 252 and 252 are extended along the Y-axis from an edge on the −Y side to substantially the center in the Y-axis direction of the bottom wall portion 251 with a gap interposed between the support portions 252 and 252 in the X-axis direction, as illustrated in FIG. 17A.

The side wall portions 253 and 253 are substantially rectangular plate-shaped portions that project from the second surface 251*d* of the bottom wall portion 251 in the +Z-direction. The side wall portions 253 and 253 are extended from substantially the center to an edge on the +Y side in the Y-axis direction of the bottom wall portion 251.

The upper plate portion 254 connects both edge sides on the +Z side of the side wall portions 253 and 253 to each other. Length in the Y-axis direction of the upper plate portion 254 is the same as length in the Y-axis direction of the side wall portions 253 and 253. An edge surface on the +Y side of the upper plate portion 254 is flush with edge surfaces on the +Y side of the side wall portions 253 and 253, as illustrated in FIG. 17B. The edge surfaces on the +Y side of the upper plate portion 254 and the side wall portions 253 and 253 form a slide surface 250*a* that comes into contact with a projecting plate portion 32-6 of the first attachment portion 132 that slidingly moves parallel with the Z-axis. In addition, at the center of the upper plate portion 254, a female screw 254*a* that is screwed onto the bolt 38 is formed, as illustrated in FIG. 18A.

When the second attachment portion 250 formed in this way is viewed from the −Y side, the +X side and the −X side of the bottom wall portion 251 project to the outer side of the support portions 252 and 252 and the side wall portions 253 and 253, respectively, as illustrated in FIG. 18B. At the top edges of the projecting portions of the bottom wall portion 251, the third locking portions 251*c* are formed. Width W4 in the X-axis direction of the bottom wall portion 251 is wider than width of an opening 31*a* of the crosspiece member 31 illustrated in FIG. 19.

Next, a process of arranging the attachment portion 235 on the crosspiece member 31 and attaching a solar panel P is described. Note that a process of attaching the crosspiece member 31 on a roof surface R of a building is as described above.

After attaching the crosspiece member 31, a worker first brings the projecting plate portion 32-6 into contact with the slide surface 250*a* of the second attachment portion 250, as illustrated in FIG. 17B. Then, the worker screws the bolt 38 that is inserted through the first attachment portion 132 into the female screw 254*a* and the female screw 251*b* (both are illustrated in FIG. 18B) that are formed in the second attachment portion 250. In this way, the worker brings the attachment portion 235 into a state in which the first attachment portion 132 and the second attachment portion 250 are combined by the bolt 38.

Figure 20A:
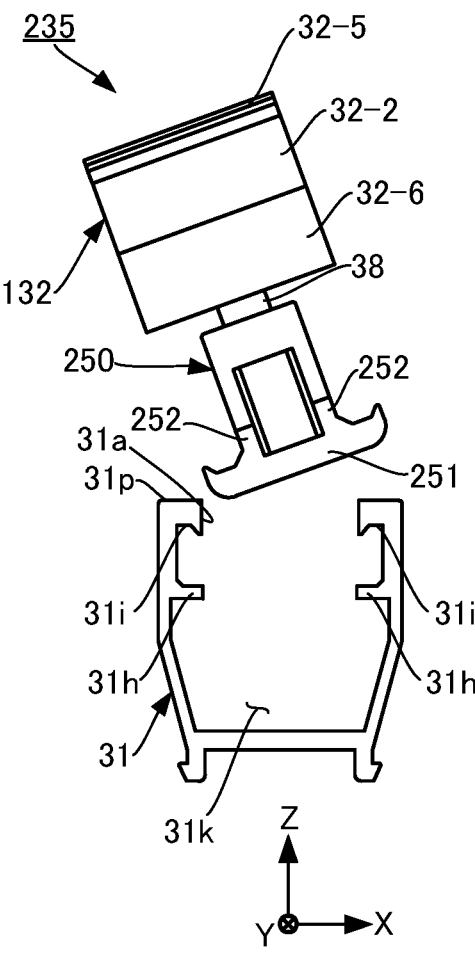
FIG. 20A is a side view illustrating work to attach the attachment portion to the crosspiece member in the trestle according to Embodiment 4 in accordance with a work sequence.

Next, the worker rotates the attachment portion 235 about the Y-axis and brings the attachment portion 235 into an inclined attitude, as illustrated in FIG. 20A.

Figure 20B:
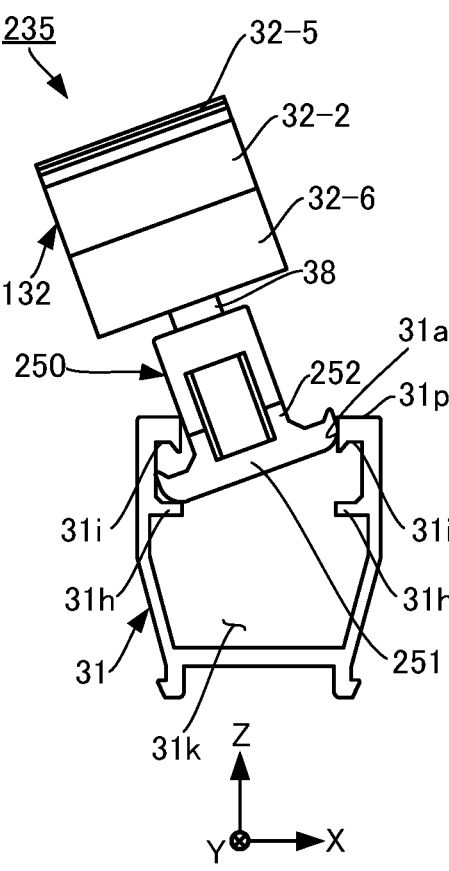
FIG. 20B is another side view illustrating the work to attach the attachment portion to the crosspiece member in the trestle according to Embodiment 4 in accordance with the work sequence, succeeding to FIG. 20A.

Succeedingly, the worker inserts the inclined attachment portion 235 into the opening 31*a* that is formed in the crosspiece member 31, as illustrated in FIG. 20B. As described above, the width in the X-axis direction of the bottom wall portion 251 is wider than the width of the opening 31*a* of the crosspiece member 31. Therefore, by inclining the attachment portion 235, the bottom wall portion 251 can be inserted from the opening 31*a*.

Figure 20C:
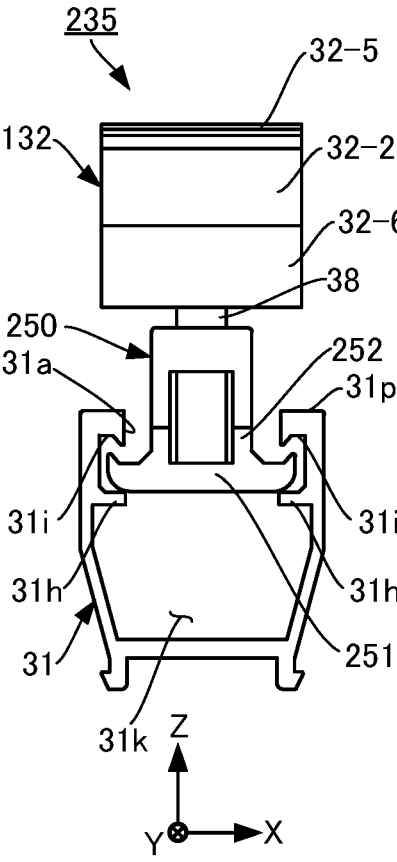
FIG. 20C is still another side view illustrating the work to attach the attachment portion to the crosspiece member in the trestle according to Embodiment 4 in accordance with the work sequence, succeeding to FIG. 20B.

Next, when the entire bottom wall portion 251 is housed in the housing space 31*k*, the worker rotates the attachment portion 235 about the Y-axis and returns the attitude of the attachment portion 235 to the original attitude, as illustrated in FIG. 20C. Then, the worker places the attachment portion 235 on the second projecting portions 31*h* and 31*h* of the crosspiece member 31. On this occasion, the bottom wall portion 251 is brought into a state of being disposed in a bridging manner between the second projecting portions 31*h* and 31*h*. As described above, the second projecting portions 31*h* and 31*h* has placement surfaces on which the attachment portion 235 can be placed.

Succeedingly, the worker arranges a solar panel P between the temporarily placed attachment portion 235 and the crosspiece member 31. Specifically, the solar panel P is arranged between an extended portion 32-5 of the first attachment portion 132 and the placement surface 31*p* of the crosspiece member 31.

Finally, the worker fully tightens the bolt 38 of the attachment portion 235 and fixes the solar panels P to the crosspiece member 31.

Through the above operation, work to install the trestle 301 and the solar panel P on the roof surface of the building is completed.

Note that as illustrated in FIG. 19, a cap 260 for crosspiece member and a cap 270 for attachment member may be attached to an end of the crosspiece member 31 and the attachment portion 235, respectively. The cap 260 for crosspiece member is a cap in which a recessed portion 261 that matches an external shape of the crosspiece member 31 is formed. By fitting an end of the crosspiece member 31 into the recessed portion 261 of the cap 260 for crosspiece member, the cap 260 for crosspiece member is attached. In addition, on the cap 270 for attachment member, snap-fits 271 that are locked to the projecting plate portion 32-6 are formed. By fitting the snap-fits 271 onto the projecting plate portion 32-6, the cap 270 for attachment member is attached to the attachment portion 235.

According to the trestle 301 according to Embodiment 4, each of the attachment portions 235 to attach solar panels P to the crosspiece member 31 includes the second attachment portion 250 that is placed on the crosspiece member 31 and the first attachment portion 132 that clamps a solar panel P between the first attachment portion 132 and the crosspiece member 31 and is also combined with the second attachment portion 250 in a slidable manner in a direction in which the first attachment portion 132 presses the solar panel P. Because of this configuration, it is possible to prevent the first attachment portion 132 from falling over by the second attachment portion 250 and stabilize an attitude of the attachment portion 235 arranged on the crosspiece member 31. Stabilizing the attachment portion 235 as described above enables attachment work of solar panels P to be facilitated and efficiency of attachment work of a panel to be improved.

Specifically, as illustrated in FIG. 20C, on the second attachment portion 250, the bottom wall portion 251 that is placed on the second projecting portions 31*h* of the crosspiece member 31 in a bridging manner is formed. Length over which the second projecting portions 31*h* and the bottom wall portion 251 come into contact with each other can be set to an arbitrary length, and a sufficient length that enables the attitude of the attachment portion 235 to be stabilized can thus be secured.

In addition, the first attachment portion 132 and the second attachment portion 250 are combined in a slidable manner in a direction parallel with a pressing direction of a solar panel P by sliding the projecting plate portion 32-6 formed on the first attachment portion 132 on the slide surface 250*a* that is an end surface of the second attachment portion 250. Because of this configuration, an axial force introduced into the bolt 38 can be smoothly transmitted to the first attachment portion 132, and a solar panel P can be clamped between the first attachment portion 132 and the crosspiece member 31.

Figure 20D:
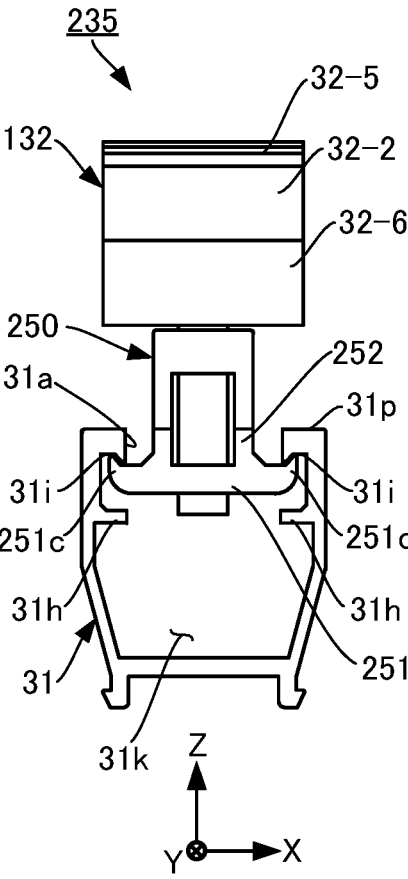
FIG. 20D is still another side view illustrating the work to attach the attachment portion to the crosspiece member in the trestle according to Embodiment 4 in accordance with the work sequence, succeeding to FIG. 20C.

In addition, as illustrated in FIG. 20D, the protrusion-shaped third locking portions 251*c* and 251*c* that are fitted into groove portions 31*i* and 31*i* formed on the crosspiece member 31, respectively are formed on the second attachment portion 250. Because of this configuration, the attachment portion 235 can be attached to the crosspiece member 31 in a stable state.

In addition, on the second attachment portion 250, the support portions 252 that come into contact with a surface of the solar panel P facing the −Z side are formed. Because of this configuration, the support portions 252 are caught by the solar panel P, which enables the attachment portion 235 to be prevented from falling over. Because of this capability, efficiency of attachment work of a panel can be improved.

The present disclosure is not limited to the above-described embodiments, and various modifications and applications are possible. Although in Embodiments 1 to 3 described above, the plate-shaped projecting plate portion 32-6 is described as an insertion portion formed on the first attachment portion 32 or 132, the shape of the insertion portion can be arbitrarily set. For example, the insertion portion may be formed in a bar-shaped portion, such as a round column and a rectangular column. In this case, the inserted portion formed on the second attachment portion 33 or 133 may be formed in a shape that matches the insertion portion, such as a circular recessed portion and a rectangular recessed portion.

In addition, in the above-described embodiments, an insertion portion and an inserted portion are formed on the first attachment portion 32 or 132 and the second attachment portion 33 or 133, respectively. However, on which attachment portion each of the insertion portion and the inserted portion is to be formed can be arbitrarily chosen, and the insertion portion and the inserted portion may be formed on the second attachment portion 33 or 133 and the first attachment portion 32 and 132, respectively.

In addition, a case where in the crosspiece member 31, a gap is formed between the second projecting portions 31*h* and 31*h* and the cables 2 of the solar panels P are housed through the gap is described. However, whether or not a gap is formed between the second projecting portions 31*h* and 31*h* can be arbitrarily chosen, and the crosspiece member 31 may be formed in a form in which the inside of the crosspiece member 31 is partitioned by a partition wall without forming a gap.

In addition, when a solar panel P is fixed to the crosspiece member, attachment portions described in Embodiments 1 to 4 can be used in a mixed manner. For example, as an attachment portion for middle position that presses two solar panels P by both sides, the attachment portion 235 described in Embodiment 4 may be used, and as an attachment portion for end that presses a solar panel P by only one side, the attachment portion 35 (35*a*) described in Embodiment 1 may be used.

In addition, although in the above-described embodiments, it is described that the crosspiece member 31 is fixed via the base portion 70 illustrated in FIG. 1, a fixing method of the crosspiece member 31 can be arbitrarily chosen, and a fixing method can be selected according to an attachment site of the trestle.

In addition, in the above-described embodiments, the description is made assuming that the trestle is intended to fix a solar panel. However, the present disclosure is not limited to the configuration. The trestle may be intended to support an installation on a roof of a house other than a solar panel. For example, the trestle may be intended to support a panel for water heater. The trestle is capable of supporting a panel as long as the panel is a trestled panel.

In addition, in the above-described embodiments, a case where the trestle is attached on a roof surface R of a building is described. However, an installation place of the trestle can be arbitrarily chosen. For example, the trestle may be installed on a rooftop of a building or may be installed on the ground. In addition, a panel may be faced toward various directions according to a function of the panel, and for example, a panel may be arranged facing upward.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

1 Trestle
2 Cable
3 Notch
4 Bolt hole
10 Base
10*a* First groove
11 Groove formation portion
11L, 11R Side wall portion
12L, 12R Second groove
13L, 13R Slide restricting portion
14L, 14R Flange portion
14*a*-1 Hole for fastener insertion
15 Base main body
16 Wall portion
16-1 First inclined surface
16-2 Second inclined surface
16-3 Protruding surface
20 Support member
21 Groove for height direction adjustment
23 Projecting portion
30 Fixing portion 31 Crosspiece member
31*a* Opening
31*b* Side wall portion
31*c* Bottom wall portion
31*d* Upper wall portion
31*e* First locking portion
31*f* First projecting portion
31*g* Partition wall portion
31*h* Second projecting portion
31*i*, 31*j* Groove portion
31*k* Housing space
31*p* Placement surface
32 First attachment portion
32-1, 32-2 Side wall portion
32-3 Joining plate portion
32-3*a* Bolt insertion hole
32-4, 32-5 Extended portion
32-6 Projecting plate portion
32*a* Recessed portion
33 Second attachment portion
33-1 Bottom wall portion
33-1*a* Bottom surface
33-2 First rising portion
33-3 Second rising portion
33*a* Insertion groove
33*b* Second locking portion
33-1*b*, 33*ba* Upper surface
35 Attachment portion
35*a* Attachment portion for end
35*b* Attachment portion for middle position
36 Projecting plate portion
38 Bolt
38*a* Head
38*b* Hexagon socket
39 Nut
39*a* Third locking portion
39*b* Groove portion
39*c* Short side
39*d* Long side
39*e* Female screw
40 Receiving member
40*a* Hole
40*b* First locked portion
41 Receiving member main body
41-1, 41-2 Side wall portion
41-3 Bottom plate portion
42 Pinching portion
42-1, 42-2 Extended portion
50 Base unit
60 First fastener
61 Bolt
62 Nut
70 Base portion
101 Trestle
131 Crosspiece member
132 First attachment portion
133 Second attachment portion
133*b* Second locking portion
134 Trapezoidal cylindrical portion
134*a* Inclined wall portion
134*b* Side wall portion
134*c* Upper plate portion
135 Attachment portion
201 Trestle
235 Attachment portion
250 Second attachment portion
250*a* Slide surface 251 Bottom wall portion
251a First surface
251b Female screw
251c Third locking portion
251d Second surface
252 Support portion
253 Side wall portion
254 Upper plate portion
254a Female screw
260 Cap for crosspiece member
261 Recessed portion
270 Cap for attachment member
271 Snap-fit
301 Trestle
A1. A2 Arrow
B1 Fastener for support member attachment
B2 Fastener for base attachment
D1 First direction
G1. G2 Gap
H Height direction
H1, H2 Height
L1 Projection length
L2 Length
P Solar panel
P1 First surface
P2 Second surface
P3 Force
R Roof surface
S Slide fitting
Sa Screw hole
t1 Thickness
W1, W2, W3, W4 Width

The invention claimed is:

1. A trestle for installing a panel at an installation place, the trestle comprising:
a base portion fixed to the installation place;
a crosspiece portion supported by the base portion; and
an attachment portion for attaching the panel to the crosspiece portion, wherein
the attachment portion includes a first attachment portion to press the panel in a pressing direction pointing toward the crosspiece portion and clamp the panel between the first attachment portion and the crosspiece portion and a second attachment portion placed on a placement surface of the crosspiece portion, and
the first attachment portion is combined with the second attachment portion in such a manner as to be able to slide the panel in the pressing direction., wherein
an insertion portion that extends in the pressing direction is formed on the first attachment portion and the second attachment portion, and an inserted portion into which the insertion portion is inserted and that enables the insertion portion to move in the pressing direction is formed, wherein
the insertion portion is a projecting plate portion that projects from the first attachment portion in the pressing direction, and
the inserted portion is an insertion groove into which the projecting plate portion is inserted and that is formed on the second attachment portion, wherein
the second attachment portion includes a locking portion coming into contact with a surface of the panel on an opposite side to a surface of the panel on which the first attachment portion presses the panel, wherein
the second attachment portion includes a bottom wall portion coming into contact with a placement surface of the crosspiece portion, a first rising portion rising from the bottom wall portion, a second rising portion rising from the bottom wall portion with a gap interposed between the first rising portion and the second rising portion, and the locking portion extended out from the bottom wall portion, and
between the first rising portion and the second rising portion, the insertion groove is formed.
2. The trestle according to claim 1, wherein
the first attachment portion includes two side wall portions arranged facing each other, a joining plate portion connecting one edge sides of the two side wall portions to each other, and extended portions each extending outward from one of the other edge sides opposed to the one edge sides of the two side wall portions, and
the projecting plate portion projects from the joining plate portion in the pressing direction.
3. The trestle according to claim 2, wherein
a groove portion that extends in a direction in which the crosspiece portion extends is formed from an outer circumferential surface of the crosspiece portion toward an inside,
the attachment portion includes a bolt inserted into the first attachment portion and the second attachment portion and a nut screwing onto the bolt and housed in and locked to the groove portion of the crosspiece portion, and
the panel is clamped between the extended portion and the crosspiece portion by an axial force introduced into the bolt.
4. The trestle according to claim 3, wherein
the nut is formed in a quadrilateral shape having a longitudinal direction and changes an attitude between a first attitude in which the longitudinal direction is aligned with an extending direction of the groove portion and the nut is freely removable and insertable from and into the groove portion and a second attitude in which the nut has rotated about an axis of the bolt from the first attitude and the nut is caught by the groove portion.
5. The trestle according to claim 4, wherein
a protruding portion and a recessed portion that engage with each other are formed when the nut and the groove portion come into contact with each other.
6. The trestle according to claim 3, wherein
a bolt hole is formed into which the bolt is inserted in each of the first attachment portion and the second attachment portion.
7. The trestle according to claim 3, wherein
in the first attachment portion, a bolt hole into which the bolt is inserted is formed, and
in the second attachment portion, a notch into which the bolt is inserted is formed.
8. The trestle according to claim 1, wherein
the locking portion is formed in such a manner as to be stepped down from the bottom wall portion and a surface of the locking portion coming into contact with the panel is flush with the placement surface of the crosspiece portion.
9. The trestle according to claim 8, wherein
two locking portions are disposed with a gap interposed between the two locking portions, the gap being wider than width in a direction orthogonal to a longitudinal direction of the crosspiece portion, and are arranged on both sides of the crosspiece portion.

10. The trestle according to claim 8, wherein
the locking portion extends from a central portion of the bottom wall portion and is housed in a groove portion of the crosspiece portion.

11. A trestle for installing a panel at an installation place, the trestle comprising:
a base portion fixed to the installation place;
a crosspiece portion supported by the base portion; and
an attachment portion for attaching the panel to the crosspiece portion, wherein
the attachment portion includes a first attachment portion to press the panel in a pressing direction pointing toward the crosspiece portion and clamp the panel between the first attachment portion and the crosspiece portion and a second attachment portion placed on a placement surface of the crosspiece portion, and
the first attachment portion is combined with the second attachment portion in such a manner as to be able to slide the panel in the pressing direction, wherein
a projecting plate portion that extends in the pressing direction is formed on the first attachment portion and the second attachment portion, a slide surface on which the projecting plate portion slides is formed, wherein
a groove portion that extends in an extending direction of the crosspiece portion is formed from an outer circumferential surface of the crosspiece portion toward an inside,
the attachment portion includes a bolt inserted into the first attachment portion and screwing into the second attachment portion, and the panel is clamped between the first attachment portion and the crosspiece portion by an axial force introduced into the bolt, wherein
the second attachment portion includes a locking portion coming into contact with a surface of the panel on an opposite side to a surface of the panel on which the first attachment portion presses the panel, wherein
the placement surface is formed on a projecting portion that is formed inside the crosspiece portion and in the groove portion,
the second attachment portion includes a bottom wall portion housed in the groove portion and temporarily placed on a placement surface and the locking portion rising from the bottom wall portion, and
a width of the bottom wall portion is wider than a width of the groove portion and when an axial force of the bolt is introduced, the bottom wall portion is caught by the crosspiece portion in the groove portion.

12. The trestle according to claim 11, wherein
the slide surface is formed at an end surface of the second attachment portion.

13. The trestle according to claim 12, wherein
the first attachment portion includes two side wall portions arranged facing each other, a joining plate portion connecting one edge sides of the two side wall portions to each other, and extended portions each extending outward from one of the other edge sides opposed to the one edge sides of the two side wall portions, and
the projecting plate portion projects from the joining plate portion in the pressing direction.

\* \* \* \* \*